United States Patent
Hata et al.

(10) Patent No.: US 7,024,490 B2
(45) Date of Patent: Apr. 4, 2006

(54) SCHEME, APPARATUS, AND PROGRAM FOR HEADER COMPRESSION

(75) Inventors: Koichi Hata, Katano (JP); Akihiro Miyazaki, Sakai (JP); Koji Imura, Machida (JP); Daiji Ido, Yokohama (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 761 days.

(21) Appl. No.: 09/985,421

(22) Filed: Nov. 2, 2001

(65) Prior Publication Data

US 2002/0064224 A1    May 30, 2002

(30) Foreign Application Priority Data

Nov. 6, 2000   (JP)   ............................. 2000-337093

(51) Int. Cl.
G60F 13/00   (2006.01)
(52) U.S. Cl. ..................................... 709/247
(58) Field of Classification Search ................ 709/247; 370/474
See application file for complete search history.

(56) References Cited

FOREIGN PATENT DOCUMENTS

EP          0 832 536 B1    6/2000

OTHER PUBLICATIONS

Carsten Burmeister: "[ROHC] Small Changes in Keyword-Cutouts", IETF Discussion Forum, 'Online', Jun. 27, 2000, XP002288034.

Anton Martensson, Torbjorn Einarsson, Lars-Erik Jonsson: "ROCCO Conversational Video Profiles" Internet-Draft, Draft-IETF-ROHC-RIP-ROCCO-Video-00, Online, May 24, 2000, XP002288035.

Akihiro Miyazaki, Hideaki Fukushima, Thomas Wiebke, Rolf Hakenberg, Carsten Burmeister: "Robust Header Compression Using Keyword-Packets", Internet Draft, Draft-Miyazaki-ROHC-KWHC-00, Online Mar. 1, 2000, XP002288036.

Carsten Burmeister et al., "Robust Header Compression (ROHC): Framework and Four Profiles: RTP, UDP, ESP, and Uncompressed <draft -ietf-rohc-rtp-09.txt>" IETF, Feb. 26, 2001.

*Primary Examiner*—Robert B. Harrell
(74) *Attorney, Agent, or Firm*—Wenderoth, Lind & Ponack, L.L.P.

(57) ABSTRACT

A transmission end (header compression end) and a reception end (header decompression end) share the same timestamp calculation information which is previously prepared. At the transmission end, in the case that the timestamp of the current packet to be subjected to header compression cannot be compressed with the current timestamp calculation information, the history record which covers timestamp calculation information previously transmitted is referred to for determining whether to transmit a packet header carrying the timestamp without updating the current timestamp calculation information, or a packet header carrying the timestamp by updating the current timestamp calculation information.

6 Claims, 16 Drawing Sheets

FIG. 2A

| PACKET (SN) | DELTA TIMESTAMP |
|---|---|
| i - 1 | 1 0 |
| i - 2 | 1 0 |
| i - 3 | 1 0 |
| i - 4 | 1 0 |
| i - 5 | 1 0 |
| i - 6 | 2 0 |
| i - 7 | 2 0 |
| i - 8 | 2 0 |
| i - 9 | 1 0 |
| i - 1 0 | 1 0 |
| ⋮ | ⋮ |

FIG. 2B

| DELTA TIMESTAMP | CONSECUTIVE NUMBER |
|---|---|
| 1 0 | 1 5 |
| 1 5 | 8 |
| 2 0 | 3 |
| 3 0 | 1 0 |
| 4 0 | 5 |
| ⋮ | ⋮ |

F I G. 7
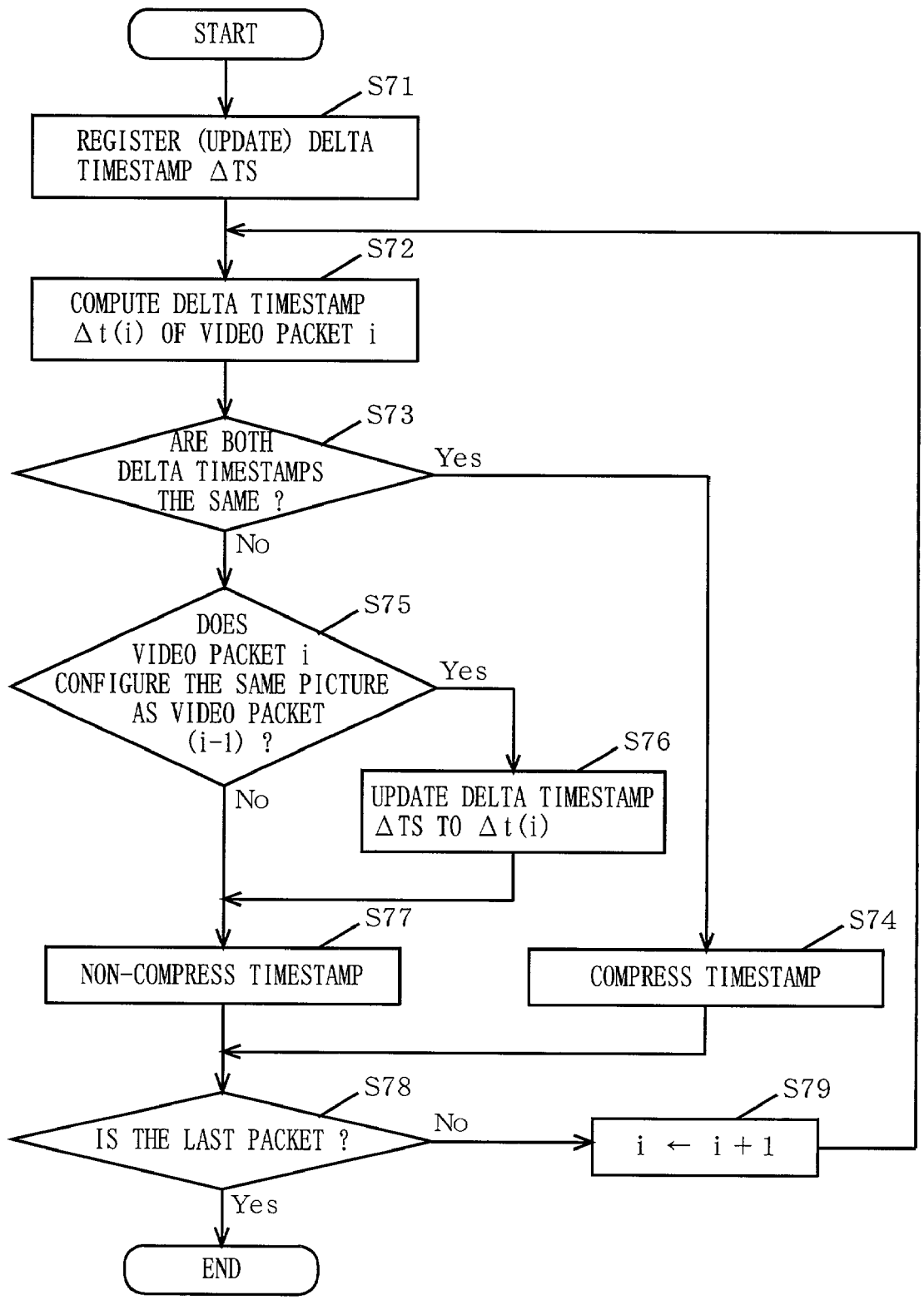

FIG. 13A PRIOR ART

INITIALIZATION PACKET HEADER ← ONE BYTE →

| 1 | 1 | 1 | 0 | | Profile Number |
|---|---|---|---|---|---|
| Static Field | | | | | Dynamic Field |

FIG. 13B PRIOR ART

REFERENCE INFORMATION UPDATE PACKET HEADER

| 1 | 1 | 0 | RTP seq LSB | Y | RTP-TS LSB |
|---|---|---|---|---|---|
| Z | CRC | | | | |

FIG. 13C PRIOR ART

MINIMUM COMPRESSION PACKET HEADER

| 0 | RTP seq LSB | CRC |
|---|---|---|

FIG. 14 PRIOR ART

EXTENSION PORTION ← ONE BYTE →

| T | S | L | P | | DELTA TIMESTAMP |
|---|---|---|---|---|---|
| Type of Service | | | | | Time To Live |
| Payload Type | | | | | |

F I G. 1 7 PRIOR ART

| INPUT PACKET HEADER | | OUTPUT PACKET HEADER | | |
|---|---|---|---|---|
| SEQUENCE NUMBER | TIMESTAMP | DELTA TIMESTAMP | HEADER FORMAT | THE NUMBER OF BYTES |
| ⋮ | ⋮ | ⋮ | ⋮ | ⋮ |
| 10 | 100 | 10 | MIN | 1 |
| 11 | 110 | 10 | MIN | 1 |
| 12 | 120 | 10 | MIN | 1 |
| 13 | 130 | 10 | MIN | 1 |
| 14 | 150 | 10 | REF | 3 |
| 15 | 170 | 10 | REF | 3 |
| 16 | 190 | 10 | REF | 3 |
| 17 | 210 | 10 | REF | 3 |
| 18 | 230 | 10 | REF | 3 |
| 19 | 240 | 10 | MIN | 1 |
| 20 | 250 | 10 | MIN | 1 |
| ⋮ | ⋮ | ⋮ | ⋮ | ⋮ |

F I G. 1 8 PRIOR ART

| INPUT PACKET HEADER || OUTPUT PACKET HEADER |||
|---|---|---|---|---|
| SEQUENCE NUMBER | TIMESTAMP | DELTA TIMESTAMP | HEADER FORMAT | THE NUMBER OF BYTES |
| ⋮ | ⋮ | ⋮ | ⋮ | ⋮ |
| 10 | 100 | 10 | MIN | 1 |
| 11 | 110 | 10 | MIN | 1 |
| 12 | 120 | 10 | MIN | 1 |
| 13 | 130 | 10 | MIN | 1 |
| 14 | 150 | 20 | REF+EXT | 5 |
| 15 | 170 | 20 | MIN | 1 |
| 16 | 190 | 20 | MIN | 1 |
| 17 | 210 | 20 | MIN | 1 |
| 18 | 230 | 20 | MIN | 1 |
| 19 | 240 | 10 | REF+EXT | 5 |
| 20 | 250 | 10 | MIN | 1 |
| ⋮ | ⋮ | ⋮ | ⋮ | ⋮ |

US 7,024,490 B2

SCHEME, APPARATUS, AND PROGRAM FOR HEADER COMPRESSION

BACKGROUND OF THE INVENTION

1. Field of the Invention

The present invention relates to schemes, apparatuses, and programs for header compression and, more specifically, to schemes for compressing packet headers at the transmission end during data transmission on a packet basis, apparatuses with the schemes adopted, and programs for realizing the schemes.

2. Description of the Background Art

Typical protocols for data transmission over the Internet currently include TCP (Transmission Control Protocol)/IP (Internet Protocol), RTP (Realtime Transport Protocol)/UDP (User Datagram protocol)/IP, and the like. At the time of data transmission under these protocols over transmission paths with a low-to-medium bit rate, a data packet will have an RTP header, a UDP header, or/and an IP header, and resultantly becomes large as shown in FIG. 8. Accordingly, the large header may increase communications overhead. As one example, in a case of transmitting 10-byte data under the UDP/IP protocol, its header will be 28 bytes and thus the data size in total will be 38 bytes. The data size becomes almost four times larger than the data which is to be actually transmitted. As a result, the transmission path will be considerably decreased in effective data transmission speed.

In order to reduce overhead increased due to transmission headers, there is a header compression scheme based on "Robust Header Compression (ROHC)" (draft-ietf-rohc-rtp-00. txt Jun. 29, 2000), which is under deliberation by IETF (Internet Engineering Task Force). This header compression scheme is specifically developed for a wireless communications network as shown in FIG. 9 which is mainly for wireless mobile phones. Such a communications network is typified by a mobile telephone network (e.g., W-CDMA) which is now increasingly popular, and specifically used for a section of wireless transmission in FIG. 9.

With the header compression scheme based on ROHC, the transmission end (header compression end) and the reception end (header decompression end) share the same reference information for header compression and decompression. One example of the reference information is timestamp calculation information. This scheme aims to achieve header decompression in a correct manner at the reception end. Referring to FIG. 10, reference information $\alpha$ is used to compress a packet header H1 at the transmission end, and the resultant compressed packet header H'1 is transmitted to the reception end. In response, the reception end uses the same reference information $\alpha$ to decompress the compressed header H'1 to the header H1.

At the time of header compression applied at the transmission end to the header H1 based on the reference information $\alpha$, the resultant compressed packet header H'1 which is to be transmitted to the reception end is represented as below.

$$H'1 = H1 * \alpha \quad (1)$$

Here, the symbol * represents any specific computing technique which varies depending on which region is to be compressed. For example, UDP port number→remain invariant, RTP sequence number→generally increase by one, and RTP timestamp→increase by 50. The reference information $\alpha$ includes information needed to compress each of those regions. When such reference information $\alpha$ is correctly retained at the reception end, the original header H1 can be correctly decompressed thereat.

Described now is the scheme for changing the reference information $\alpha$ into reference information $\beta$ at both of the transmission and reception ends with reference to FIGS. 11 and 12.

When the reference information $\alpha$ is changed into the reference information $\beta$, the transmission end compresses a packet header H3 based on the reference information $\beta$, and the resultant compressed packet header H'3 is transmitted to the reception end together with the reference information $\beta$ (see FIG. 11). At this time, presuming that the reference information $\beta$ is to be correctly updated at the reception end, the transmission end sequentially transmits packets subjected to header compression based on the reference information $\beta$ without receiving an acknowledge packet ACK from the reception end. Here, the acknowledge packet ACK is the one indicating that the reference information is correctly updated at the reception end. If failing to decompress the original packet header H3 because the reference information $\beta$ was not correctly updated due to transmission error, for example, the reception end transmits a NACK packet to the transmission end so as to request it for transmitting the reference information $\beta$ again (see FIG. 12).

FIGS. 13A to 13C show formats of various packets which are used as headers.

An initialization packet header (FIG. 13A) carries information which remain always the same throughout packet transmission (e.g., IP address, UDP port number), and the information is transmitted on a 4-byte basis. Transmitting once is enough for this type of information included in this packet.

A reference information update packet header (FIG. 13B) carries reference information, and the like, and such information is transmitted on a 3-byte basis. The reference information update packet header includes a Y bit and an RTP-TS, which are, respectively, a marker bit and a timestamp added by RTP. With a Z bit in the packet set to "1", any other type of reference information can be also transmitted thereby. FIG. 14 shows the format of an extension portion which is added to the reference information update packet header when the Z bit is set to "1". Therein, a T bit indicates whether or not there is a delta timestamp field, denoting a timestamp increase per sequence number. An S bit indicates whether or not there is a "Type Of Service" field in an IP header, while an L bit indicates whether or not there is a "Time To Live" field in the IP header. A P bit indicates whether or not there is a "Payload Type" field in an RTP header. By setting the Z bit and any other necessary bits (e.g., T, S, L, P), the corresponding information (minimum; 2 bytes, maximum; 5 bytes) can be added to headers.

In a minimum compression packet header (FIG. 13C), a sequence number and a CRC check sum are transmitted by 1 byte. This sequence number and the reference information transmitted by the reference information update packet header are used to decompress the original to-be-compressed packet. The CRC is used to check whether packet decompression has correctly worked out or not.

Described below are schemes for using and updating any specific reference information for compressing a timestamp, which is a part of header information. For compression/decompression of timestamps, the transmission and reception ends share the same reference information. Herein, the reference information is specifically timestamp calculation information dTS (e.g., delta timestamp $\Delta$TS).

For header compression at the transmission end applied to a timestamp T(SN) with a sequence number SN based on the timestamp calculation information dTS, decompression applied to the timestamp at the reception end is performed in accordance with the following equation (2).

$$T(SN) = dTS \times x + T(SN-x) \quad (2)$$

Here, "SN−x" (where x is a positive integer) denotes the sequence number of a packet which is received most recently, and "T(SN−x)" denotes its timestamp.

Thanks to the equation (2), the compressed packet header has no more need to carry a timestamp. If the reception end retains the timestamp calculation information dTS, the RTP sequence number will be enough for timestamp decompression. That is, the transmission end can delete (=compress) the timestamp from the header.

The timestamp calculation information dTS which is updated at the transmission end is forwarded to the reception end by the reference information update packet header (FIG. 13B). To be specific, in the reference information update packet header, the Z bit has been set, and the timestamp calculation information dTS has been updated and stored in the delta timestamp field of the extension portion (FIG. 14). In the case that the transmission and reception ends retain the same timestamp calculation information dTS, transmitting only the sequence number by the minimum compression packet header (FIG. 13C) can decompress the timestamp.

It should be noted that, for timestamp decompression at the reception end, the equation (2) works out only when the transmission end performs header compression in accordance with the timestamp calculation information dTS retained at the reception end. Therefore, in the case that $dt(SN) = (T(SN) - T(SN-x))/x$ is different from the timestamp calculation information dTS, i.e., if the timestamp calculation information dTS has been updated, the transmission end cannot delete the timestamp from the header. As a result, if this is the case, information is transmitted by the reference information update packet header with the non-compressed timestamp included. Here, transmitted is not the timestamp calculation information dTS, and thus there is no need to set "1" to the Z bit of the reference information update packet header.

FIG. 15 shows an exemplary structure of a header compression apparatus (transmission end) for carrying out the conventional header compression scheme. As shown in FIG. 15, the conventional header compression apparatus includes a timestamp calculation information computing part 101, a timestamp compression scheme determination part 103, a timestamp calculation information tracking part 104, a timestamp non-compression part 105, a timestamp compression part 106, and an input switch part 108.

The operation of each of these constituents of the above conventional header compression apparatus is described below.

The timestamp calculation information computing part 101 sequentially receives packets together with their headers which are to be compressed. The timestamp calculation information computing part 101 then computes the timestamp calculation information. Specifically, computed are a difference in terms of timestamp between the current packet i (where i is a positive integer) and another packet (i−1) one before the packet i, and a difference therebetween in terms of sequence number. In this manner, obtained is a delta timestamp $\Delta t(i)$ which denotes a timestamp increase per sequence number.

The timestamp calculation information tracking part 104 keeps track of timestamp calculation information, i.e., delta timestamp $\Delta TS$, which is predetermined for timestamp compression.

The timestamp compression scheme determination part 103 compares the delta timestamp $\Delta t(i)$ obtained by the timestamp calculation information computing part 101 with the delta timestamp $\Delta TS$ which is kept track by the timestamp calculation information tracking part 104. If both delta timestamps are found as being the same, i.e., $\Delta t(i) = \Delta TS$, the timestamp compression scheme determination part 103 determines that the timestamp should be compressed. Thus, the input switch part 108 is so controlled that the packet i is forwarded to the timestamp compression part 106. On the other hand, if those delta timestamps are found as being not the same, i.e., $\Delta t(i) \neq \Delta TS$, the timestamp compression scheme determination part 103 determines that the timestamp should not be compressed. Accordingly, the input switch part 108 is so controlled that the packet i is forwarded to the timestamp non-compression part 105.

The timestamp non-compression part 105 deletes the timestamp before performing packet header compression in accordance with the format of the reference information update packet header of FIG. 13B.

On the other hand, the timestamp compression part 106 does not delete the timestamp before performing packet header compression. That is, in accordance with the format of the minimum compression packet header shown in FIG. 13C, the timestamp is deleted (=compressed) so that the resultant packet header includes only the sequence number.

The input switch part 108 outputs the incoming packet i, under the control of the timestamp compression scheme determination part 103, to either the timestamp non-compression part 105 or the timestamp compression part 106.

By referring to the flowchart of FIG. 16, the entire procedure of the header compression scheme carried out by such a conventional header compression apparatus is described.

First, the delta timestamp $\Delta TS$ is registered (updated) (step S161). Its value may be predetermined, or a value obtained by computation between first and second packets may be used. Once an arbitrary packet i has been inputted, the delta timestamp $\Delta t(i)$ will be computed (step S162). Then, the delta timestamp $\Delta t(i)$ and the delta timestamp $\Delta TS$ are compared with each other (step S163). Here, if these delta timestamps are found as being the same, the minimum compression packet header carrying no timestamp is generated (step S164). If not the same, the reference information update packet header carrying a timestamp is generated (step S165). Then, if there is any packet left for such a sequence of processes (steps S166, S167), the procedure returns to step S162 and repeats the same sequence.

In the above conventional header compression scheme, however, if there observed any value change in timestamp, the timestamp is not compressed before packet transmission. The issue here is, if the timestamp remains the same for sometime after the value change, the timestamp has to be transmitted without compressed for the duration, resulting in poor efficiency in header compression.

This problem is described specifically with reference to FIG. 17. In the exemplary diagram shown in FIG. 17, the left column is for packet headers inputted at the transmission end, and indicates their sequence numbers and timestamps. The right column is for packet headers which are those obtained by applying the conventional header compression scheme to the input packet headers and outputted from the transmission end, and indicates their delta timestamps, header formats, and the numbers of bytes. In FIG. 17, MIN denotes the minimum compression packet header (FIG. 13C), while REF denotes the reference information update packet header (FIG. 13B) in which the Z bit is not set to "1" and thus no extension portion is added. Herein, the delta timestamp is presumably set to "10" in advance.

In the example of FIG. 17 under the conventional header compression scheme, the delta timestamp remains the same, i.e., "10", from the sequence numbers 10 to 13. Accordingly, only the sequence number is transmitted by the minimum compression packet header which is a 1-byte header, i.e., MIN. As to the sequence numbers 14 to 18, their actual delta timestamps are not "10" but "20". Therefore, both of the sequence number and the timestamp are transmitted by the reference information update packet header which is a 3-byte header, i.e., REF. Further, as to the sequence numbers 19 and 20, their delta timestamps are again "10". Accordingly, transmitted is only the sequence number again by the 1-byte header MIN.

As such, the conventional header compression scheme results in poor efficiency in header compression with varying delta timestamps.

Here, if it is known in advance that the sequence numbers 14 to 18 carry the same delta timestamp as "20", such header compression as shown in FIG. 18 is possible. By taking the packet of sequence number 14 as an example, the REF of 3 bytes and its extension portion (EXT) of 2 bytes are used to transmit the delta timestamp "20" so that the delta timestamp at the reception end is changed. As a result, the packets of sequence numbers 15 to 18 can be transmitted by the MIN of 1-byte. As to the packet of sequence number 19, the delta timestamp at the reception end is changed back to "10" by the REF+EXT of 5 bytes in total.

Accordingly, with such a process, the number of bytes needed to transmit packet headers of sequence numbers 10 to 20 is reduced to be 19 bytes compared with 21 bytes under the scheme of FIG. 17. With this scheme, however, the efficiency in header compression remains still poor because the number of bytes needed for header transmission is increased if the timestamp does not remain the same for sometime after its value change.

SUMMARY OF THE INVENTION

Therefore, an object of the present invention is to provide header compression schemes, apparatuses, and programs which realize enhanced efficiency in header compression, i.e., data transmission, by dynamically changing the current timestamp calculation information in comparison with its history record.

The present invention has the following features to attain the object above.

A first aspect of the present invention is directed to a header compression scheme for compressing and transmitting, by using predetermined timestamp calculation information, a packet including transmission data and a header in which a timestamp is included in a system where transmission and reception ends share the same timestamp calculation information for header compression and decompression, the method comprising:

a step of deriving timestamp calculation information dt(i) which is used to calculate a timestamp of a packet i (where i is a positive integer) to be compressed;

a step of storing the timestamp calculation information dt(i) in a history record as timestamp calculation information which has been so far transmitted;

a step of keeping track of timestamp calculation information dTS which is used for header compression;

a step of comparing the timestamp calculation information dTS and the timestamp calculation information dt(i) with each other, and when both are the same, compressing the timestamp of the packet i by using the timestamp calculation information dTS, and transmitting a resultant header carrying no timestamp; and a step of determining, when both are not the same in the comparing step, by referring to the history record, whether or not to update the timestamp calculation information dTS to the timestamp calculation information dt(i) to transmit a resultant header carrying the timestamp, if updated, together with an update signal.

As described above, in the first aspect, a history record which covers timestamp calculation information so far transmitted is prepared in advance. In the case that the timestamp calculation information of a packet which is currently processed is different from the timestamp calculation information in storage for tracking, the history record is referred to determine which information is used for header compression. In this manner, efficiency in header compression, i.e., data transmission, can be enhanced in response to the past record.

Here, preferably, when, for transmission, the header carrying no timestamp requires an F byte, the header carrying the timestamp requires an N byte, and the update signal requires an M byte, the determining step transmits the header carrying the timestamp together with the update signal indicating that the timestamp calculation information dTS is updated to the timestamp calculation information dt(i) if the history record has the same information as the timestamp calculation information dt(i) for $2\times(M+N-F)/(N-F)$ pieces or more consecutively, and if no, transmits the packet carrying no timestamp without updating the timestamp calculation information dTS.

In such a manner, whether or not to update the current timestamp calculation information can be determined by referring to the history record. If the history record has information same as the timestamp calculation information of the packet which is currently processed consecutively for a predetermined number of more, the current timestamp calculation information is updated. In this manner, efficiency in header compression, i.e., data transmission, can be enhanced in response to the past record.

A second aspect of the present invention is directed to a header compression scheme for compressing and transmitting, by using predetermined timestamp calculation information, a packet including transmission data and a header in which a timestamp is included in a system where transmission and reception ends share the same timestamp calculation information for header compression and decompression, the method comprising:

a step of deriving timestamp calculation information dt(i) to dt(j) (where i is a positive integer, and j is an integer satisfying j>i) which is used to calculate timestamps of a packet i and a predetermined number of packets (i+1) to j subsequent thereto;

a step of storing the timestamp calculation information dt(i) to dt(j);

a step of keeping track of timestamp calculation information dTS which is used for header compression;

a step of comparing the timestamp calculation information dTS and the timestamp calculation information dt(i) with each other, and when both are the same, compressing the timestamp of the packet i by using the timestamp calculation information dTS, and transmitting a resultant header carrying no timestamp; and a step of determining, when both are not the same in the comparing step, by referring to the timestamp calculation information dt(i+1) to dt(j), whether or not to update the timestamp calculation information dTS to the timestamp calculation information dt(i) to transmit a resultant header carrying the timestamp, if updated, together with an update signal.

As described above, in the second aspect, before updating the timestamp calculation information, the actual timestamp calculation information is derived correspondingly to the predetermined number of packets. In the case that the timestamp calculation information of the packet which is currently processed is different from the timestamp calculation information in storage for tracking, the actual timestamp calculation information is referred to determine which information is used for header compression. In this manner, although some delay may occur during data transmission, the actual transmission data is checked before applying processes thereto. Accordingly, efficiency in header compression can be assuredly enhanced by appropriately responding to the transmission data.

Here, preferably, when, for transmission, the header carrying no timestamp requires an F byte, the header carrying the timestamp requires an N byte, and the update signal requires an M byte, the determining step transmits the header carrying the timestamp together with the update signal indicating that the timestamp calculation information dTS is updated to the timestamp calculation information dt(i) if information same as the timestamp calculation information dt(i) appears consecutively for 2×(M+N−F)/(N−F) pieces or more from the timestamp calculation information dt(i+1), and if no, transmits the packet carrying no timestamp without updating the timestamp calculation information dTS.

In such a manner, the timestamp calculation information of the packet which is currently processed is calculated in advance for reference to determine whether or not to update the timestamp calculation information. If the timestamp calculation information appears consecutively for a predetermined number or more, the timestamp calculation information is updated. In this manner, although some delay may occur during data transmission, the actual transmission data is checked before applying processes thereto. Accordingly, efficiency in header compression can be assuredly enhanced by appropriately responding to the transmission data.

A third aspect of the present invention is directed to a header compression scheme for compressing and transmitting, by using predetermined timestamp calculation information, a packet including transmission data and a header in which a timestamp is included in a system where transmission and reception ends share the same timestamp calculation information for header compression and decompression, the method comprising:

a step of deriving timestamp calculation information dt(i) (where i is a positive integer) which is used to calculate a timestamp of a video packet i to be compressed;

a step of keeping track of timestamp calculation information dTS which is used for header compression;

a step of comparing the timestamp calculation information dTS and the timestamp calculation information dt(i) with each other, and when both are the same, compressing the timestamp of the video packet i by using the timestamp calculation information dTS, and transmitting a resultant video packet carrying no timestamp; and a step of determining, when both are not the same in the comparing step, depending on if the video packet i configures the same picture as a video packet (i−1) one before, whether or not to update the timestamp calculation information dTS to the timestamp calculation information dt(i) to transmit a resultant header carrying the timestamp, if updated, together with an update signal.

As described above, in the third aspect, in the case that the timestamp calculation information of a video packet which is currently processed is different from the timestamp calculation information in storage for tracking, to determine which information should be used for header compression, the current video packet is referred to see if configuring the same picture as another video packet one before. In this manner, efficiency in header compression can be assuredly enhanced in response to transmission data.

Here, preferably, the determining step checks a marker bit which is set only to a last packet configuring one picture, and when the marker bit is not set to the video packet (i−1), determines that the video packet i configures the same picture as the video packet (i−1), and transmits the video packet carrying no timestamp together with the update signal indicating that the timestamp calculation information dTS is updated to the timestamp calculation information dt(i) if the video packet i configures the same picture as the video packet (i−1), and if not, transmits the video packet carrying the timestamp without updating the timestamp calculation information dTS.

As such, before updating the timestamp calculation information, the marker bit is used to check whether the current video packet configures the same picture as the preceding video packet. If configuring the same picture, the timestamp calculation information is updated. In this manner, efficiency in header compression can be assuredly enhanced in response to transmission data.

A fourth aspect of the present invention is directed to a header compression apparatus for compressing and transmitting, by using predetermined timestamp calculation information, a packet including transmission data and a header in which a timestamp is included in a system where transmission and reception ends share the same timestamp calculation information for header compression and decompression, the apparatus comprising:

a computing part for deriving timestamp calculation information dt(i) which is used to calculate a timestamp of a packet i (where i is a positive integer) to be compressed;

a history record storage part for storing the timestamp calculation information dt(i) in a history record as timestamp calculation information which has been so far transmitted;

a tracking part for keeping track of timestamp calculation information dTS which is used for header compression;

a first header compression part for compressing the timestamp of the packet i based on the timestamp calculation information dTS, and transmitting a resultant header carrying no timestamp;

a second header compression part for not compressing the timestamp of the packet i, and transmitting a resultant header carrying the timestamp;

a compression scheme determination part for comparing said timestamp calculation information dTS and the timestamp calculation information dt(i) with each other, and if both are the same, controlling the packet i to go to the first header compression part, and if not, controlling the packet i to go to the second header compression part and determining whether or not to update the timestamp calculation information dTS kept track by the tracking part to the timestamp calculation information dt(i) based on the history record; and an update signal control part for controlling, when the timestamp calculation information dTS is updated to the timestamp calculation information dt(i), the second header compression part to include an update signal.

As described above, in the fourth aspect, a history record which covers timestamp calculation information so far transmitted is prepared in advance. In the case that the timestamp calculation information of a packet which is currently processed is different from the timestamp calculation information in storage for tracking, the history record is referred to determine which information is used for header compression. In this manner, efficiency in header compression, i.e., data transmission, can be enhanced in response to the past record.

Here, preferably, when, for transmission, the header carrying no timestamp requires an F byte, the header carrying the timestamp requires an N byte, and the update signal requires an M byte, the compression scheme determination part controls the tracking part to update the timestamp calculation information dTS to the timestamp calculation information dt(i) if the history record has the same information as the timestamp calculation information dt(i) for 2×(M+N−F)/(N−F) pieces or more consecutively, and if no, not to update the timestamp calculation information dTS.

In such a manner, whether or not to update the current timestamp calculation information can be determined by referring to the history record. If the history record has information same as the timestamp calculation information of the packet which is currently processed consecutively for a predetermined number of more, the current timestamp calculation information is updated. In this manner, efficiency in header compression, i.e., data transmission, can be enhanced in response to the past record.

A fifth aspect of the present invention is directed to a header compression apparatus for compressing and transmitting, by using predetermined timestamp calculation information, a packet including transmission data and a header in which a timestamp is included in a system where transmission and reception ends share the same timestamp calculation information for header compression and decompression, the apparatus comprising:

a computing part for deriving timestamp calculation information dt(i) to dt(j) (where i is a positive integer, and j is an integer satisfying j>i) which is used to calculate timestamps of a packet i and a predetermined number of packets (i+1) to j subsequent thereto;

a storage part for storing the timestamp calculation information dt(i) to dt(j);

a tracking part for keeping track of timestamp calculation information dTS which is used for header compression;

a first header compression part for compressing the timestamp of the packet i based on the timestamp calculation information dTS, and transmitting a resultant header carrying no timestamp;

a second header compression part for not compressing the timestamp of the packet i, and transmitting a resultant header carrying the timestamp;

a compression scheme determination part for comparing the timestamp calculation information dTS and the timestamp calculation information dt(i) with each other, and if both are the same, controlling the packet i to go to the first header compression part, and if not, controlling the packet i to go to the second header compression part and determining whether or not to update the timestamp calculation information dTS kept track by the tracking part to the timestamp calculation information dt(i) based on the timestamp calculation information dt(i+1) to dt(j); and an update signal control part for controlling, when the timestamp calculation information dTS is updated to the timestamp calculation information dt(i), the second header compression part to include an update signal.

As described above, in the fifth aspect, before updating the timestamp calculation information, the actual timestamp calculation information is derived correspondingly to the predetermined number of packets. In the case that the timestamp calculation information of the packet which is currently processed is different from the timestamp calculation information in storage for tracking, the actual timestamp calculation information is referred to determine which information is used for header compression. In this manner, although some delay may occur during data transmission, the actual transmission data is checked before applying processes thereto. Accordingly, efficiency in header compression can be assuredly enhanced by appropriately responding to the transmission data.

Here, preferably, when, for transmission, the header carrying no timestamp requires an F byte, the header carrying the timestamp requires an N byte, and the update signal requires an M byte, the compression scheme determination part controls the tracking part to update the timestamp calculation information dTS to the timestamp calculation information dt(i) if information same as the timestamp calculation information dt(i) appears consecutively for 2×(M+N−F)/(N−F) pieces or more from the timestamp calculation information dt(i+1), and if no, not to update the timestamp calculation information dTS.

In such a manner, the timestamp calculation information of the packet which is currently processed is calculated in advance for reference to determine whether or not to update the timestamp calculation information. If the timestamp calculation information appears consecutively for a predetermined number or more, the timestamp calculation information is updated. In this manner, although some delay may occur during data transmission, the actual transmission data is checked before applying processes thereto. Accordingly, efficiency in header compression can be assuredly enhanced by appropriately responding to the transmission data.

A sixth aspect of the present invention is directed to a header compression apparatus for compressing and transmitting, by using predetermined timestamp calculation information, a packet including transmission data and a header in which a timestamp is included in a system where transmission and reception ends share the same timestamp calculation information for header compression and decompression, the apparatus comprising:

a computing part for deriving timestamp calculation information dt(i) which is used to calculate a timestamp of a video packet i (where i is a positive integer) to be compressed;

a tracking part for keeping track of timestamp calculation information dTS which is used for header compression;

a first header compression part for compressing the timestamp of the video packet i based on the timestamp calculation information dTS, and transmitting a resultant packet header carrying no timestamp;

a second header compression part for not compressing the timestamp of the video packet i, and transmitting a resultant packet header carrying the timestamp;

a compression scheme determination part for comparing the timestamp calculation information dTS and the timestamp calculation information dt(i) with each other, and if both are the same, controlling the video packet i to go to the first header compression part, and if not, controlling the video packet i to go to the second header compression part and determining whether or not to update the timestamp calculation information dTS kept track by the tracking part to the timestamp calculation information dt(i) based on whether the video packet i configures the same picture as a video packet (i−1) one before; and an update signal control part for controlling, when the timestamp calculation information dTS is updated to the timestamp calculation information dt(i), the second header compression part (15) to include an update signal.

As described above, in the sixth aspect, in the case that the timestamp calculation information of a video packet which is currently processed is different from the timestamp calculation information in storage for tracking, to determine which information should be used for header compression, the current video packet is referred to see if configuring the same picture as another video packet one before. In this manner, efficiency in header compression can be assuredly enhanced in response to transmission data.

Here, preferably, the compression scheme determination part checks a marker bit which is set only to a last packet configuring one picture, and when the marker bit is not set to the video packet (i−1), determines that the video packet i configures the same picture as the video packet (i−1), and controls the tracking part to update the timestamp calculation information dTS to the timestamp calculation information dt(i) if the video packet i configures the same picture as the video packet (i−1), and if not, not to update the timestamp calculation information dTS.

As such, before updating the timestamp calculation information, the marker bit is used to check whether the current video packet configures the same picture as the preceding video packet. If configuring the same picture, the timestamp calculation information is updated. In this manner, efficiency in header compression can be assuredly enhanced in response to transmission data.

Typically, the header compression schemes of the present invention directed by the above first to third aspects can be realized by having computer devices carry out a predetermined program in which the procedure is programmed. This predetermined program may be previously stored in storage devices provided in the computer devices, e.g., ROMs, RAMs, hard disks, or may be installed to the computer devices via recording media into which such a program can be written, e.g., CD-ROMS, floppy disks.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are diagrams showing exemplary delta timestamp history records;

FIG. 7 is a flowchart showing the procedure of the header compression scheme according to the third embodiment of the present invention;

FIGS. 13A to 13C are diagrams in assistance of explaining formats for to-be-compressed headers of various types;

FIG. 14 is a diagram in assistance of explaining a format of an extension portion which is added to the to-be-compressed header;

FIG. 17 is a diagram in assistance of explaining, conceptually, an update method for updating timestamp calculation information; and FIG. 18 is a diagram in assistance of explaining, conceptually, an ideal update method for updating timestamp calculation information.

DESCRIPTION OF THE PREFERRED EMBODIMENTS

Figure 9:
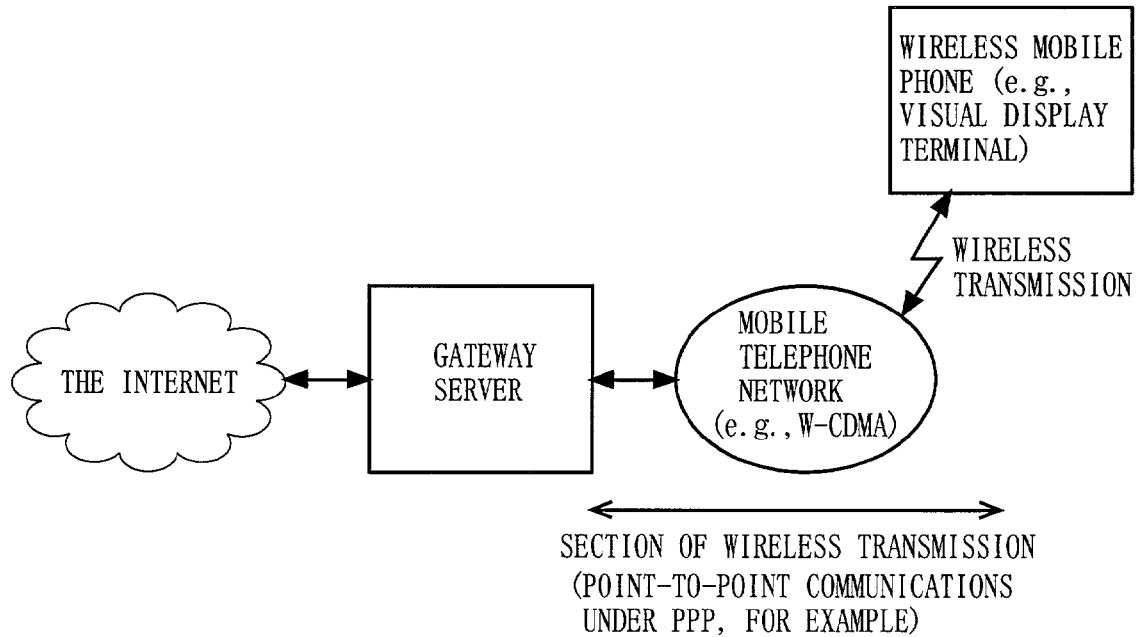
FIG. 9 is a diagram showing an exemplary structure of a wireless communications network to which a conventional header compression scheme is applied.
Figure 10:
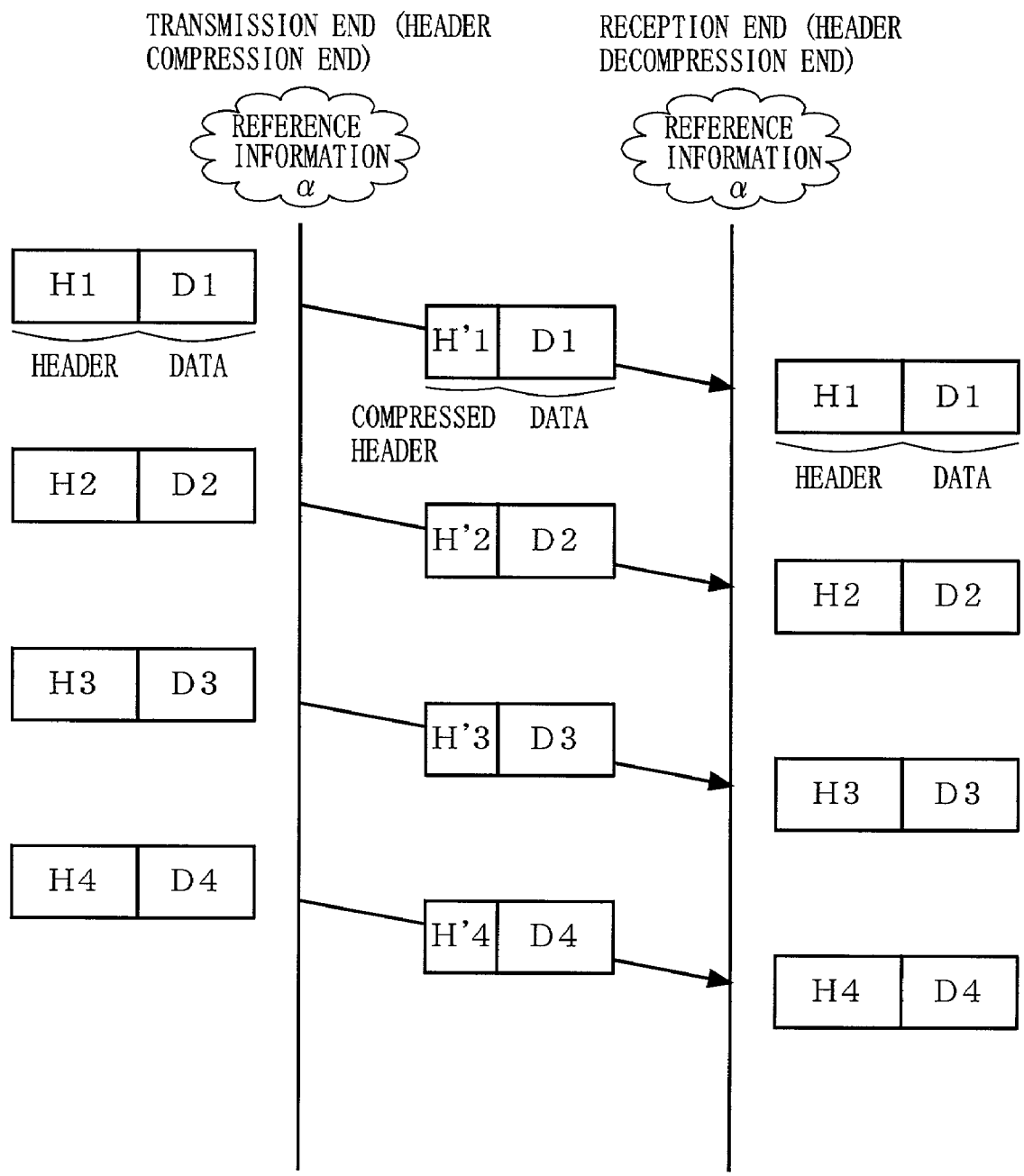
FIGS. 10 to 12 are diagrams in assistance of explaining the procedure under the conventional header compression scheme.
Figure 11:
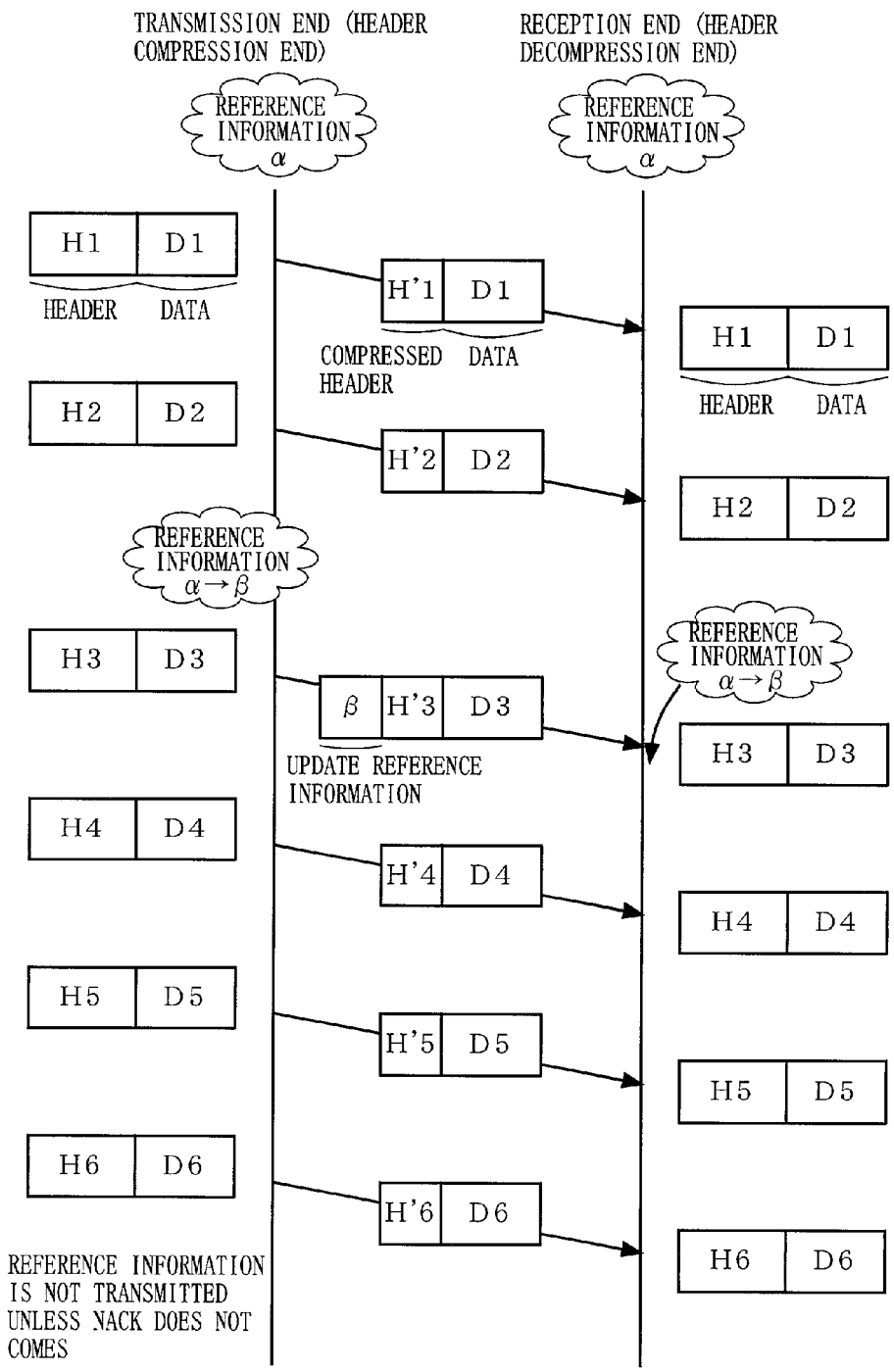
Figure 12:
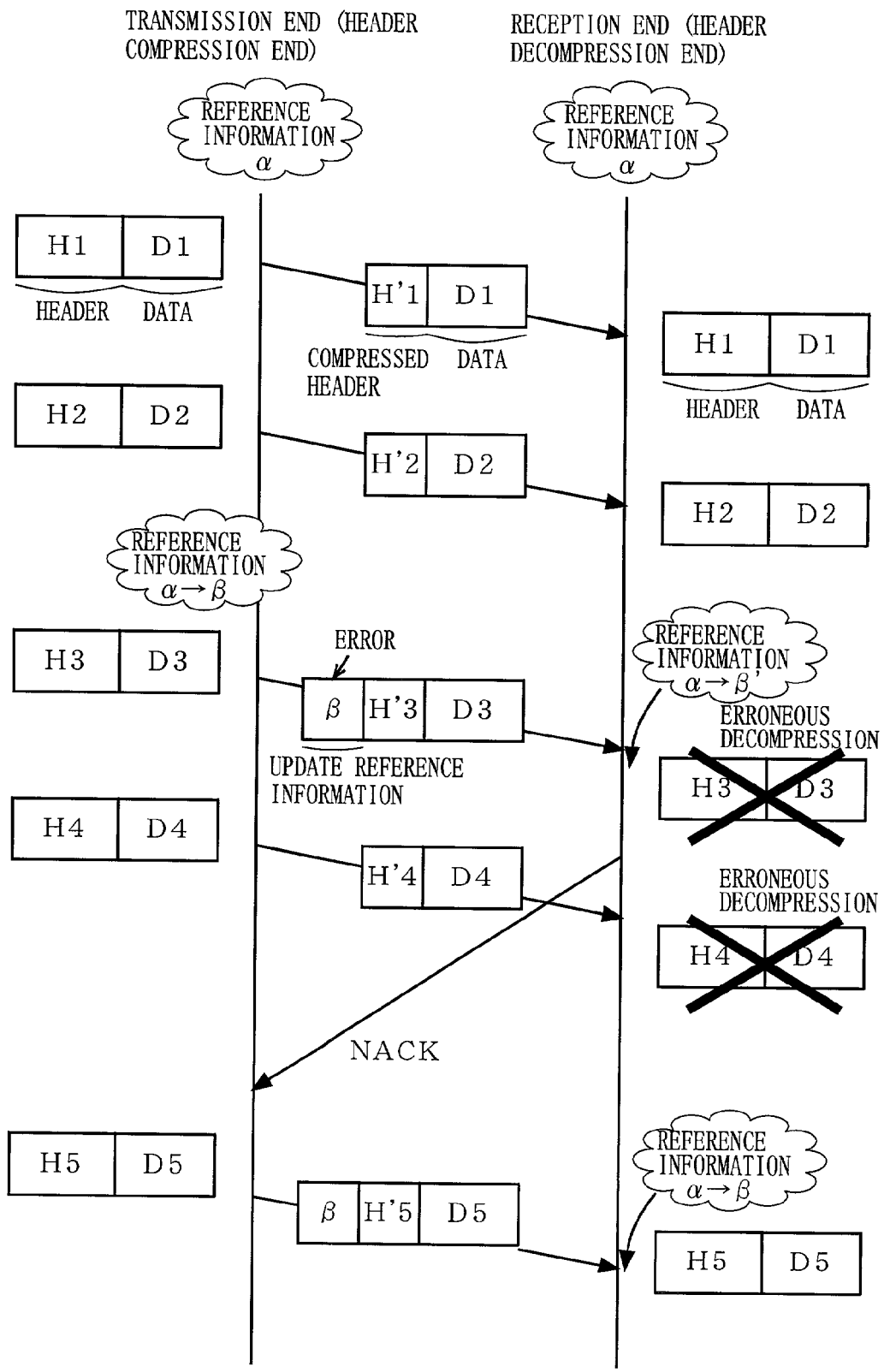
Figure 15:
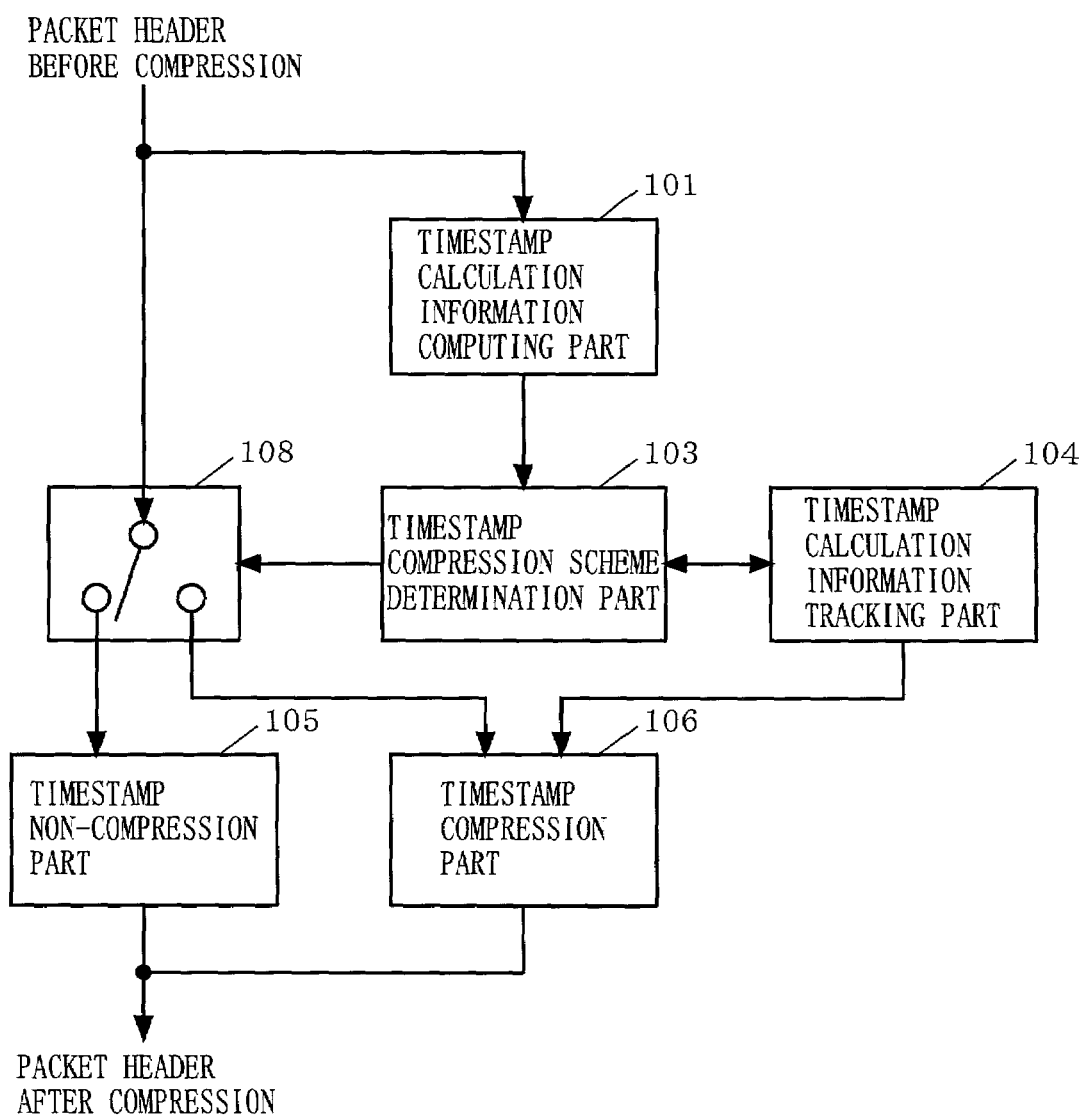
FIG. 15 is a block diagram showing the structure of a header compression apparatus for carrying out the conventional header compression scheme.
Figure 16:
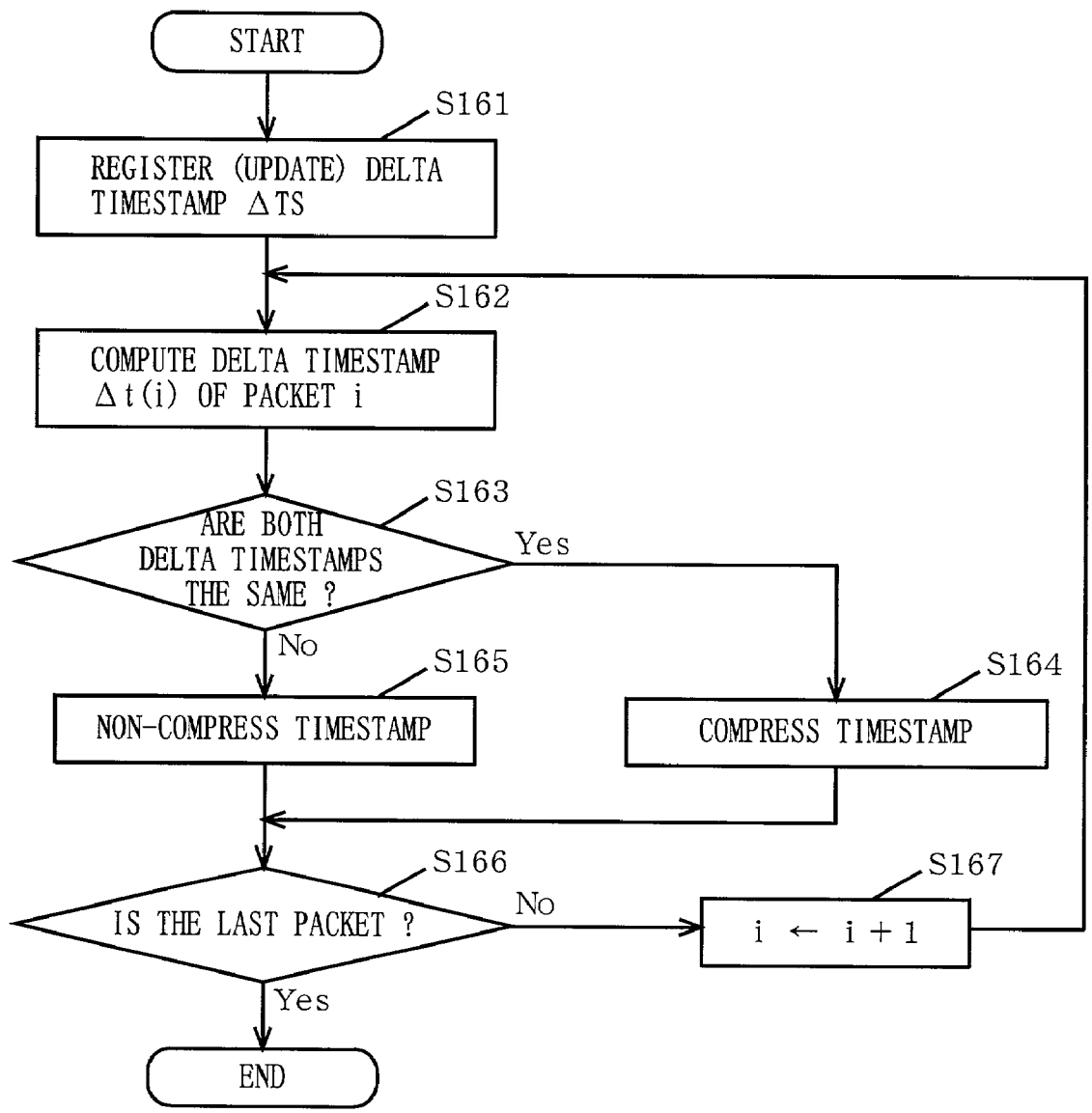
FIG. 16 is a flowchart showing the procedure of the conventional header compression scheme.

The header compression scheme provided by the present invention is a technique applied to data transmission specifically for the section of wireless communications in the wireless communications network as shown in FIG. 9. Typically, the header compression apparatus for carrying out such a header compression scheme is structured in gateway servers, and composed of a CPU, a storage device, and an input/output device, for example. In the header compression apparatus, the CPU executes a header compression program which is previously stored in the storage device so that the header compression scheme is realized.

Embodiments of the present invention are described below by referring to the accompanying drawings.

First Embodiment

Figure 1:
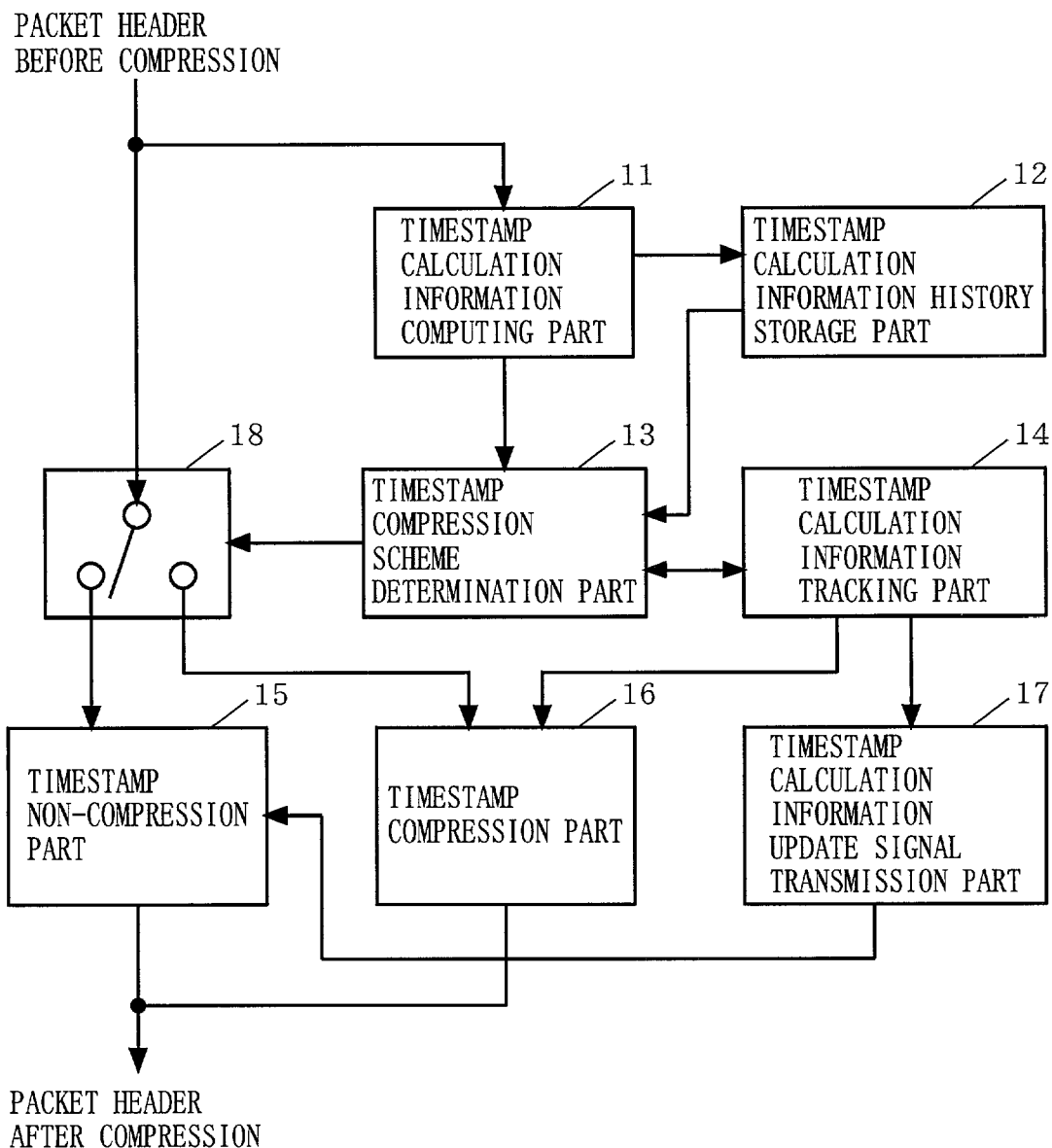
FIG. 1 is a block diagram showing the structure of a header compression apparatus for carrying out a header compression scheme according to a first embodiment of the present invention.

FIG. 1 is a block diagram showing the structure of a header compression apparatus for carrying out a header compression scheme according to a first embodiment of the present invention. In FIG. 1, the header compression apparatus of the first embodiment includes a timestamp calculation information computing part 11, a timestamp calculation information history storage part 12, a timestamp compression scheme determination part 13, a timestamp calculation information tracking part 14, a timestamp non-compression part 15, a timestamp compression part 16, a timestamp calculation information update signal transmission part 17, and an input switch part 18.

The timestamp calculation information computing part 11 sequentially receives packets together with their headers which are to be compressed. The timestamp calculation information computing part 11 then computes the timestamp calculation information. Specifically, computed are a difference in terms of timestamp between the current packet and another packet one before. The timestamp calculation information history storage part 12 stores the history record which covers the timestamp calculation information so far computed as such. The timestamp compression scheme determination part 13 determines which timestamp compression scheme is to be applied to the current packet. This determination is made based on the timestamp calculation information calculated by the timestamp calculation information computing part 11, the history record of timestamp calculation information stored by the timestamp calculation information history storage part 12, and the timestamp calculation information kept track by the timestamp calculation information tracking part 14. The timestamp calculation information tracking part 14 keeps track of the timestamp calculation information which is used for timestamp compression. The timestamp non-compression part 15 applies compression to packet headers but not to their timestamps. The timestamp compression part 16 first deletes the timestamps based on the timestamp calculation information, and performs header compression to the packet headers. The timestamp calculation information update signal transmission part 17 sends out an update signal when, in response, the timestamp calculation information kept track by the timestamp calculation information tracking part 14 is updated. Under the control of the timestamp compression scheme determination part 13, the input switch part 18 outputs packets either the timestamp non-compression part 15 or the timestamp compression part 16.

Described next is the header compression scheme carried out in the header compression apparatus of the first embodiment in such a structure.

Input data of this embodiment is coded data derived from moving pictures or sound which is assembled into packets under RTP, UDP, or IP. As to an inputted packet, its RTP, UDP, or IP header is compressed at the transmission end for transmission to the reception end. At the reception end, the RTP, UDP, or IP header is decompressed, and as a result, the original packet is outputted. The packet header includes a timestamp and a sequence number.

The timestamp calculation information computing part 11 computes the timestamp calculation information. Specifically, computed are a difference in terms of timestamp between the current packet i (where i is a positive integer) and another packet (i−1) one before the packet i, and a difference therebetween in terms of sequence number. In this manner, obtained is a delta timestamp $\Delta t(i)$ which denotes a timestamp increase per sequence number. Thus obtained delta timestamp $\Delta t(i)$ is outputted to both the timestamp calculation information history storage part 12 and the timestamp compression scheme determination part 13.

The timestamp calculation information history storage part 12 stores the history record covering the predetermined number of delta timestamps which have been so far computed. Exemplary delta timestamp history records are shown in FIGS. 2A and 2B. The delta timestamp history record is not restricted in type, and as shown in FIG. 2A, may be of a type showing delta timestamps together with their corresponding packets (sequence number: SN). Or as shown in FIG. 2B, it may be of a type showing values which indicate how many times the same delta timestamp appears consecutively (e.g., maximum value, minimum value, average value). The delta timestamp history record is referred to by the timestamp compression scheme determination part 13 as appropriate.

The timestamp compression scheme determination part 13 compares the delta timestamp $\Delta t(i)$ obtained by the timestamp calculation information computing part 11 with the delta timestamp $\Delta TS$ which is kept track by the timestamp calculation information tracking part 14. If both delta timestamps are found as being the same, i.e., $\Delta t(i)=\Delta TS$, the timestamp compression scheme determination part 13 determines that the timestamp should be compressed. Thus, the input switch part 18 is so controlled that the packet i is forwarded to the timestamp compression part 16. On the other hand, if those delta timestamps are found as being not the same, i.e., $\Delta t(i) \neq \Delta TS$, the timestamp compression scheme determination part 13 refers to the delta timestamp history record in the timestamp calculation information history storage part 12 so as to determine whether or not to update the current delta timestamp $\Delta TS$. This update is done for the purpose of enhancing efficiency in compressed header transmission of the packet (i+1) and others thereafter. For this determination, the delta timestamp history record is referred to see if the obtained delta timestamp $\Delta t(i)$ appears consecutively for the predetermined number of times x (will be later described) or more. If yes, the timestamp compression scheme determination part 13 updates the delta timestamp $\Delta TS$ to the delta timestamp $\Delta t(i)$. Also, the timestamp compression scheme determination part 13 controls the input switch part 18 so that the packet i goes to the timestamp non-compression part 15. On the other hand, if the computed delta timestamp $\Delta t(i)$ does not appear consecutively for the predetermined number of times x or more, the timestamp compression scheme determination part 13 controls, without updating the delta timestamp $\Delta TS$, the input switch part 18 so that the packet i goes to the timestamp non-compression part 15.

Considered now is the number of bytes of the packet header formats shown in FIGS. 13A to 13C, respectively, in terms of efficiency in transmission of the packet (i+1) and others thereafter, that is, whether updating the current delta timestamp $\Delta TS$ to the delta timestamp $\Delta t(i)$ before transmitting the header with timestamp compressed leads to better efficiency.

In order to update delta timestamps, there needs to transmit an update signal for the purpose. Transmitting this update signal requires 2 bytes (=M bytes) of the T bit and the delta timestamp field out of the extension portion shown in FIG. 14. Further, since this extension portion is to be added to the header-compressed packet in which the timestamp is not compressed (i.e., reference information update packet header of FIG. 13B), 3 more bytes (=N bytes) will be required. As such, updating a delta timestamp requires 5 bytes (=M+N bytes).

Considered here is a case that the delta timestamp $\Delta t(i)$ which is not the same as the current delta timestamp $\Delta TS$ appears consecutively for the number of times r.

In the case that the delta timestamp $\Delta TS$ is not to be updated, r pieces of timestamps are transmitted by the header-compressed packet of N-byte in which the timestamp is not compressed. In such a case, transmitting r pieces of delta timestamps $\Delta t(i)$ requires (N×r) bytes. Note here that, in this case, there is no need to change the value of the delta timestamp back to original after a sequence of processes subjected to r pieces of packets. Therefore, the packet to be transmitted thereafter may include the 1-byte (=F-byte) minimum compression packet header (FIG. 13C) carrying only the sequence number.

On the other hand, in the case that the delta timestamp ΔTS is to be updated, the first packet i needs to include an update signal for the purpose, resultantly requiring (M+N) bytes as described above. With the update signal sent, the (r−1) pieces of packets following thereafter, i.e., packets (i+1) to (i+r−1), may include the F-byte minimum compression packet headers. After r pieces of packets are processed, however, there needs to go through a process of changing the delta timestamp Δt(i) back to the original value ΔTS (or update the delta timestamp Δt(i) to any other value). Accordingly, transmitting the next packet (i+r) requires (M+N) bytes again as transmitting the first packet i. In this case, transmitting r pieces of the delta timestamps Δt(i) requires {(M+N)+F×(r−1)+(M+N−F)} bytes.

As such, if the number r of pieces of delta timestamps Δt(i) satisfies the following equation (3), updating the delta timestamp ΔTS will enhance efficiency in header transmission.

$$(M+N)+F\times(r-1)+(M+N-F) \leq N \times r \therefore r \geq 2\times(M+N-F)/(N-F) \tag{3}$$

In the present embodiment, F=1, M=2, and N=3. Accordingly, if r is 4 (=predetermined number x) or larger, updating the delta timestamp ΔTS will enhance efficiency in packet transmission.

As such, the timestamp compression scheme determination part 13 refers to the delta timestamp history record to see if the same delta timestamp as the delta timestamp Δt(i) obtained by the timestamp calculation information computing part 11 appears consecutively for x number of times or more. If yes, the timestamp compression scheme determination part 13 instructs the timestamp calculation information tracking part 14 to update the delta timestamp ΔTS. Also, the input switch part 18 is controlled that the packet i is supplied to the timestamp non-compression part 15. If the same delta timestamp as the delta timestamp Δt(i) does not appear consecutively for the x number of times or more, the timestamp compression scheme determination part 13 controls, without updating the delta timestamp ΔTS, the input switch part 18 so that the packet i goes to the timestamp non-compression part 15.

In response to the update instruction coming from the timestamp compression scheme determination part 13, the timestamp calculation information tracking part 14 updates the currently registered delta timestamp ΔTS to the delta timestamp Δt(i) which is obtained by the timestamp calculation information computing part 11, and then registers the new value. After registering thus newly obtained delta timestamp Δt(i), the timestamp calculation information tracking part 14 notifies the timestamp calculation information update signal transmission part 17 as such.

The timestamp non-compression part 15 compresses the packet i, without deleting the timestamp, in accordance with the format of the reference information update packet header of FIG. 13B.

On the other hand, the timestamp compression part 16 compresses the packet i including the timestamp. That is, in accordance with the format of the minimum compression packet header shown in FIG. 13C, the timestamp is deleted (=compressed) so that the resultant packet includes only the sequence number.

In response to the notification that the delta timestamp ΔTS has been updated, with respect to the reference information update packet header which is currently processed by the timestamp non-compression part 15, the timestamp calculation information update signal transmission part 17 sets the Z bit to "1", and adds the delta timestamp field of the extension portion. The updated delta timestamp Δt(i) is then stored in the delta timestamp field for transmission.

Figure 3:
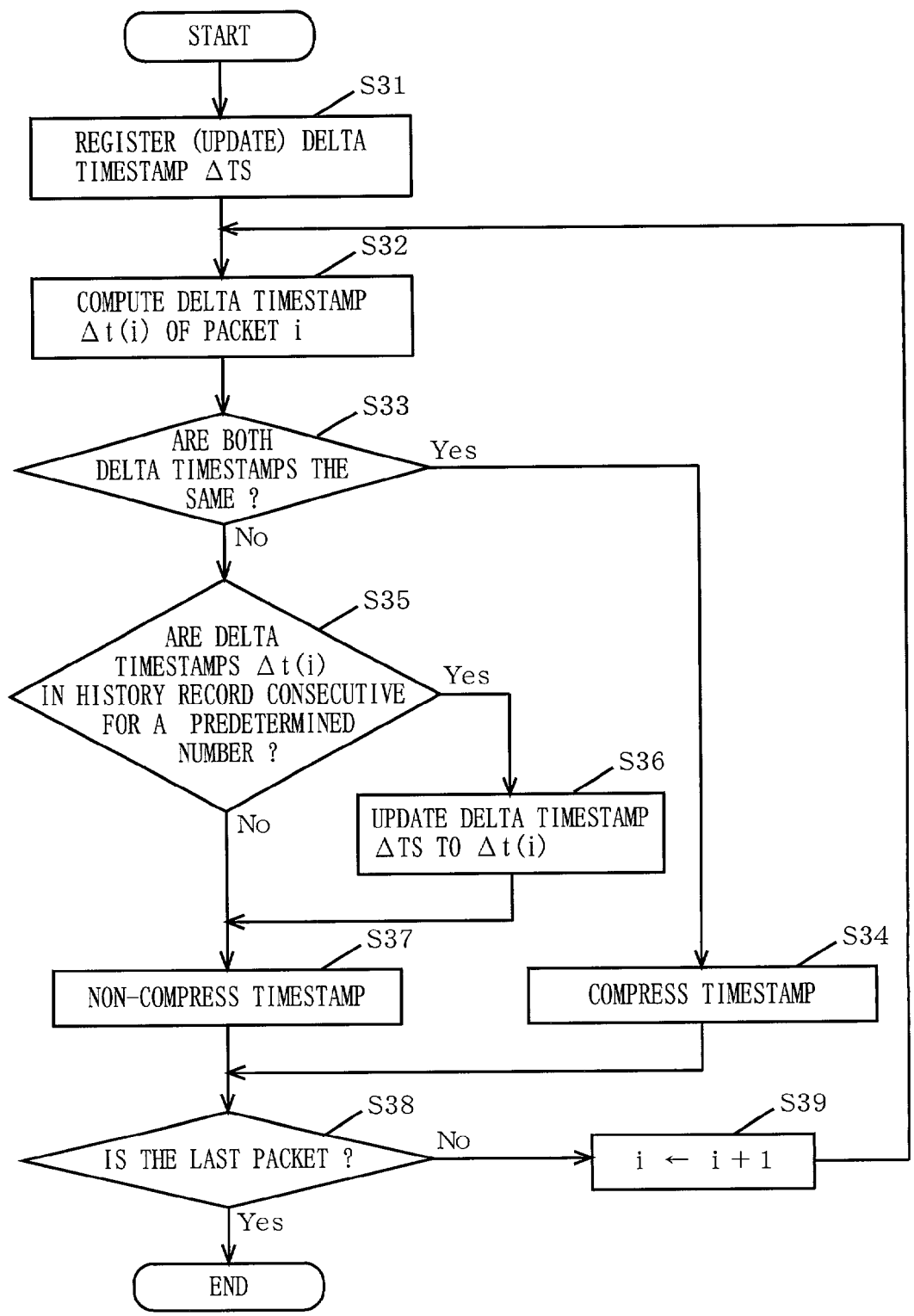
FIG. 3 is a flowchart showing the procedure of the header compression scheme according to the first embodiment of the present invention.

Lastly, by referring to the flowchart of FIG. 3, described is the procedure of the header compression scheme carried out by the header compression apparatus of the first embodiment.

First, the delta timestamp ΔTS is registered (updated) (step S31). Its value may be predetermined, or a value obtained by computation between first and second packets may be used. Once an arbitrary packet i has been inputted, the delta timestamp Δt(i) will be computed (step S32). Then, the delta timestamp Δt(i) and the delta timestamp ΔTS are compared with each other (step S33). Here, if these delta timestamps are found as being the same, the minimum compression packet header carrying no timestamp is generated (step S34). If not the same, the delta timestamp history record is referred to see if the delta timestamp Δt(i) appears consecutively for the number of times x or more (step S35). If yes, the delta timestamp ΔTS is updated (step S36), and the reference information update packet header carrying a timestamp is generated (step S37). At this time, any field of the extension portion needed to update the delta timestamp is added. If the delta timestamp Δt(i) does not appear consecutively for the number of times x or more, the reference information update packet header is generated without the delta timestamp ΔTS updated (step S37). At this time, no extension portion is added to update the delta timestamp. Then, if there is any packet left for such a sequence of processes (steps S38, S39), the procedure returns to step S32 and repeats the same sequence.

As described above, according to the header compression scheme and apparatus of the first embodiment, before updating the timestamp calculation information, the history record covering the timestamp calculation information so far computed for the previous packets is referred to. In the history record, if information same as the current timestamp calculation information appears consecutively for the predetermined number of times or more, the current timestamp calculation information is updated.

In such a manner, efficiency in header compression, i.e., data transmission, can be enhanced appropriately in consideration of the past record.

Second Embodiment

In the header compression scheme of the first embodiment, the past record is used to predict how data transmission will be performed from now on. Under such a scheme, however, the actual efficiency of data transmission may be lowered even if estimation result is appropriately utilized to update the timestamp calculation information.

Thus, described now is the header compression scheme of a second embodiment which never fails to enhance efficiency in data transmission by checking actual transmission data before updating the timestamp calculation information.

Figure 4:
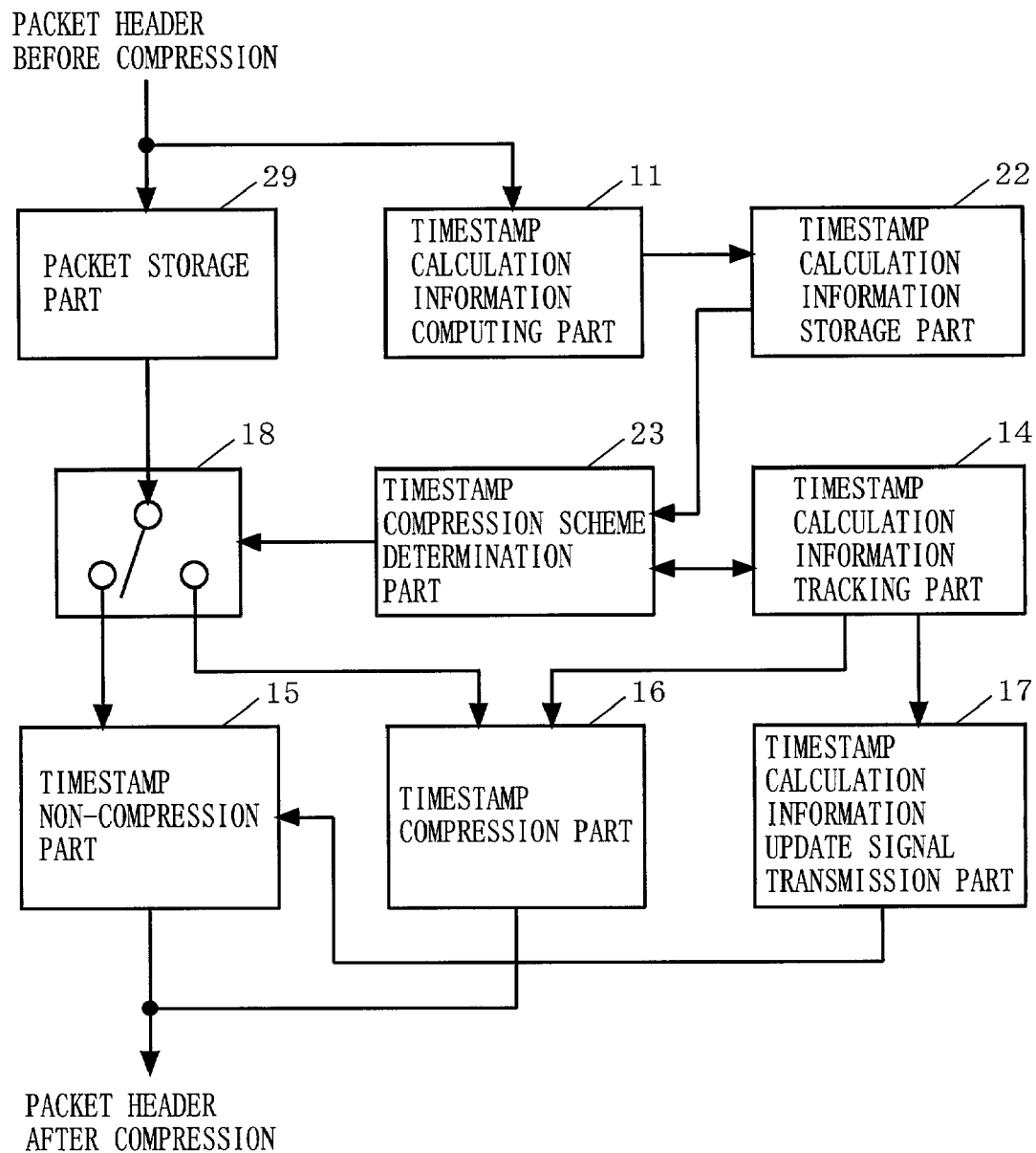
FIG. 4 is a block diagram showing the structure of a header compression apparatus for carrying out a header compression scheme according to a second embodiment of the present invention.

FIG. 4 is a block diagram showing the structure of a header compression apparatus for carrying out the header compression scheme according to the second embodiment of the present invention. In FIG. 4, the header compression apparatus of the second embodiment includes the timestamp calculation information computing part 11, a timestamp calculation information storage part 22, a timestamp compression scheme determination part 23, the timestamp calculation information tracking part 14, the timestamp non-compression part 15, the timestamp compression part 16, the timestamp calculation information update signal transmission part 17, the input switch part 18, and a packet storage part 29.

As shown in FIG. 4, in the header compression apparatus of the second embodiment, the timestamp calculation information storage part 22 and the timestamp compression scheme determination part 23 are included in place of the timestamp calculation information history storage part 12 and the timestamp compression scheme determination part 13 in the header compression apparatus of the first embodiment, and the packet storage part 29 is further included. These are the only structural differences from the first embodiment, and thus any identical constituent is provided with the same reference numeral, and not described again.

The packet storage part 29 sequentially receives packets together with their headers which are to be compressed, and temporarily stores the predetermined number of packets, in a FIFO (first-in, first-out) manner, for output. The timestamp calculation information storage part 22 stores the timestamp calculation information computed by the timestamp calculation information computing part 11 correspondingly to the packets stored in the packet storage part 29. The timestamp compression scheme determination part 23 determines which timestamp compression scheme is to be applied to the first (temporally) packet stored in the packet storage part 29. This determination is made based on several pieces of timestamp calculation information stored in the timestamp calculation information storage part 22, and the timestamp calculation information which is kept track by the timestamp calculation information tracking part 14. Under the control of the timestamp compression scheme determination part 23, the input switch part 18 sequentially outputs the packets stored in the packet storage part 29 either to the timestamp non-compression part 15 or the timestamp compression part 16.

Described now is the header compression scheme carried out in the header compression scheme of the second embodiment in such a structure, focusing on any difference from the first embodiment. Here, for the sake of clarity, the packet storage part 29 presumably stores packets i to j (where j is an integer satisfying j>i).

The timestamp calculation information computing part 11 computes the timestamp calculation information. Specifically, computed are a difference in terms of timestamp between the current packet and another packet one before, and a difference therebetween in terms of sequence number. In this manner, obtained is a delta timestamp which denotes a timestamp increase per sequence number. Here, the timestamp calculation information computing part 11 computes delta timestamps $\Delta t(i)$ to $\Delta t(j)$ corresponding to the packets i to j stored in the packet storage part 29. Note here that a delta timestamp $\Delta t(k)$ (k=i to j) indicates a difference in terms of timestamp between the packet (k−1) and the packet k. The resultant delta timestamps $\Delta t(i)$ to $\Delta t(j)$ are forwarded to the timestamp calculation information storage part 22.

The delta timestamps $\Delta t(i)$ to $\Delta t(j)$ corresponding to the packets i to j stored in the packet storage part 29 are stored in the timestamp calculation information storage part 22. Thus stored delta timestamps $\Delta t(i)$ to $\Delta t(j)$ are referred to by the timestamp compression scheme determination part 23 as appropriate.

The timestamp compression scheme determination part 23 compares the delta timestamp $\Delta t(i)$ of the first packet i with the delta timestamp $\Delta TS$ which is kept track by the timestamp calculation information tracking part 14. If both delta timestamps are found as being the same, i.e., $\Delta t(i)=\Delta TS$, the timestamp compression scheme determination part 23 determines that the timestamp should be compressed. Thus, the input switch part 18 is so controlled that the packet i stored in the packet storage part 29 is forwarded to the timestamp compression part 16. On the other hand, if those delta timestamps are found as being not the same, i.e., $\Delta t(i) \neq \Delta TS$, the timestamp compression scheme determination part 23 refers to the delta timestamps $\Delta t(i+1)$ to $\Delta t(j)$ stored in the timestamp calculation information storage section 22 so as to determine whether or not to update the current delta timestamp $\Delta TS$. This update is done for the purpose of enhancing efficiency in header transmission of the packet (i+1) and others thereafter. For this determination, it is determined whether or not the same value as the delta timestamp $\Delta t(i)$ appears consecutively for the predetermined number of times x or more. Here, the predetermined number x is already mentioned in the first embodiment, and when x=4, checked is whether the values of the delta timestamps $\Delta t(i+1)$ to $\Delta t(i+3)$ are the same as the delta timestamp $\Delta t(i)$. In this case where x=4, it is enough for the packet storage part 29 to always carry 4 packets, and for the timestamp calculation information storage part 22 to carry 4 delta timestamps corresponding to those 4 packets.

If the delta timestamp $\Delta t(i)$ appears consecutively for the predetermined number of times x, the timestamp compression scheme determination part 23 updates the current delta timestamp $\Delta TS$ to the delta timestamp $\Delta t(i)$. Also, the input switch part 18 is controlled so that the packet i stored in the packet storage part 29 goes to the timestamp non-compression part 15. On the other hand, if the delta timestamp $\Delta t(i)$ does not appear consecutively for the predetermined number of times x, the timestamp compression scheme determination part 23 controls, without updating the delta timestamp $\Delta TS$, the input switch part 18 so that the packet i goes to the timestamp non-compression part 15.

As such, by the time when the packet i is processed, the packet storage part 29 has stored a new packet (j+1), while the timestamp calculation information storage part 22 has stored a newly computed delta timestamp $\Delta t(j+1)$. At this time, the delta timestamp $\Delta t(i)$ which is already processed may be deleted.

Figure 5:
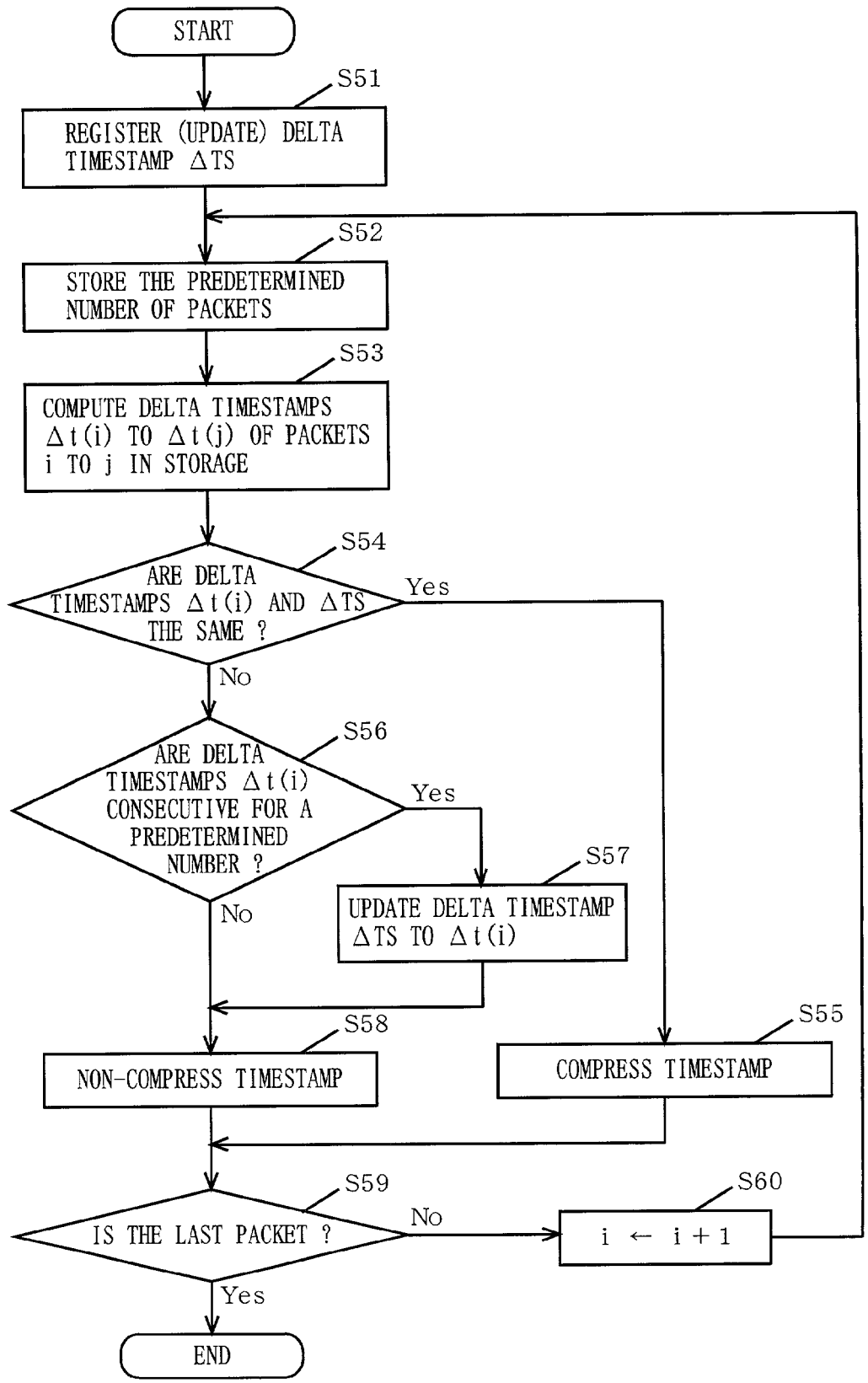
FIG. 5 is a flowchart showing the procedure of the header compression scheme according to the second embodiment of the present invention.

Lastly, by referring to the flowchart of FIG. 5, described is the procedure of the header compression scheme carried out by the header compression apparatus of the second embodiment.

First, the delta timestamp $\Delta TS$ is registered (updated) (step S51). Its value may be predetermined, or a value obtained by computation between first and second packets may be used. Packets are stored for a predetermined number, and delta timestamps $\Delta t(i)$ to $\Delta t(j)$ will be computed correspondingly to the stored packets j to j (steps S52, S53). Then, the delta timestamp $\Delta t(i)$ of the first packet i and the delta timestamp $\Delta TS$ are compared with each other (step S54). Here, if these delta timestamps are found as being the same, the minimum compression packet header carrying no timestamp is generated (step S55). If not the same, the delta timestamp $\Delta t(i)$ is referred to see if being the same as any of those consecutive delta timestamps $\Delta t(i+1)$ to $\Delta t(i+x)$ (step S56). If yes, the delta timestamp $\Delta TS$ is updated (step S57), and the reference information update packet header carrying a timestamp is generated (step S58). At this time, any field of the extension portion needed to update the delta timestamp is added. If no, on the other hand, the reference information update packet header is generated without the delta timestamp $\Delta TS$ updated (step S58). At this time, no extension portion is added to update the delta timestamp. Then, if there is any packet left for such a sequence of processes (steps S59, S60), the procedure returns to step S52 and repeats the same sequence.

As described above, according to the header compression scheme and apparatus of the second embodiment, before updating the timestamp calculation information, the actual timestamp calculation information is derived each from the predetermined number of packets which have been previously in storage for tracking. If information same as the timestamp calculation information of the current packet appears consecutively for the predetermined number of times, the timestamp calculation information is updated.

In this manner, although some delay may occur during data transmission, the actual transmission data is checked before applying processes thereto. Accordingly, efficiency in header compression can be assuredly enhanced by appropriately responding to the transmission data.

Third Embodiment

The header compression scheme of a third embodiment is the one derived by applying the header compression schemes of the first and second embodiments to a case that image data of one picture (frame) is transmitted by a plurality of video packets under MPEG (Moving Picture Experts Group), for example. The header compression scheme of the third embodiment effectively utilizes that the video packets of the same picture group share the same timestamp. Here, whether or not any two video packets configure one picture, it is determined by the presence or absence of a marker bit in the RTP header which is set only to the last packet of one picture.

Figure 6:
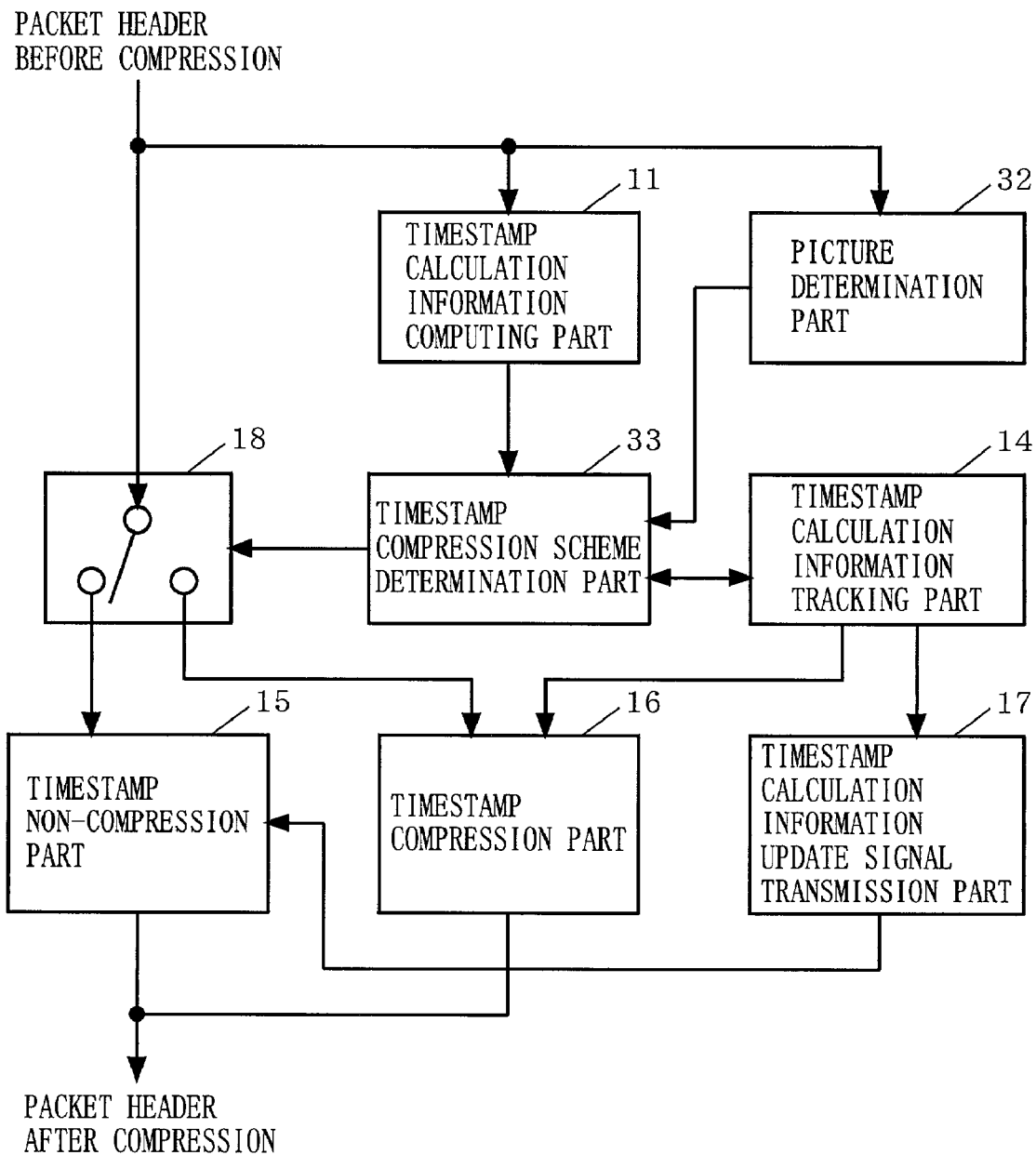
FIG. 6 is a block diagram showing the structure of a header compression apparatus for carrying out a header compression scheme according to a third embodiment of the present invention.
Figure 8:
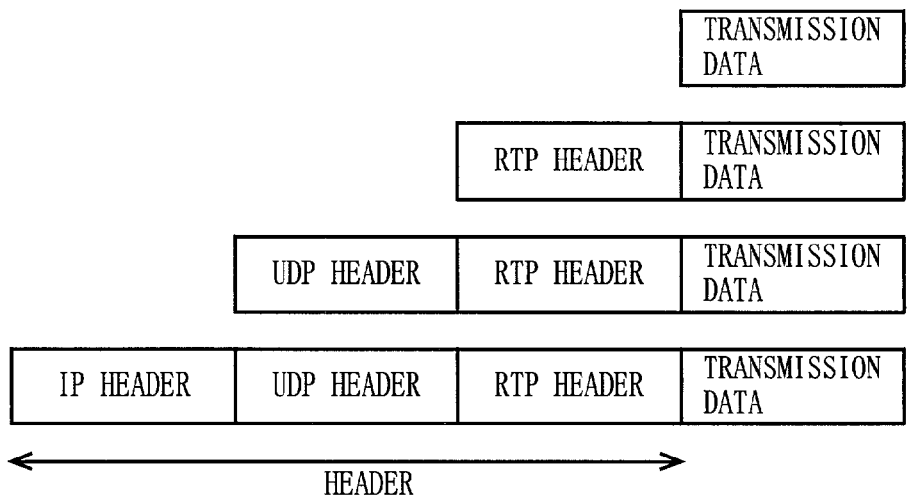
FIG. 8 is a diagram in assistance of explaining the header size which varies depending on protocol types.

FIG. 6 is a block diagram showing the structure of a header compression apparatus for carrying out such a header compression scheme according to the third embodiment of the present invention. In FIG. 6, the header compression apparatus of the third embodiment includes the timestamp calculation information computing part 11, a picture determination part 32, a timestamp compression scheme determination part 33, the timestamp calculation information tracking part 14, the timestamp non-compression part 15, the timestamp compression part 16, the timestamp calculation information update signal transmission part 17, and the input switch part 18.

As shown in FIG. 6, in the header compression apparatus of the third embodiment, the picture determination part 32 and the timestamp compression scheme determination part 33 are included in place of the timestamp calculation information history storage part 12 and the timestamp compression scheme determination part 13 in the header compression apparatus of the first embodiment. This is the only structural difference from the first embodiment, and thus any identical constituent is provided with the same reference numeral, and not described again.

The picture determination part 32 sequentially receives video packets together with their headers which are to be compressed, and determines whether or not the current video packet configure the same picture as another video packet one before. The timestamp compression scheme determination part 33 determines which timestamp compression scheme is to be applied to the current video packet. This determination is made based on the timestamp calculation information computed by the timestamp calculation information computing part 11, the timestamp calculation information which is kept track by the timestamp calculation information tracking part 14, and the determination result by the picture determination part 32.

Described now is the header compression scheme carried out in the header compression scheme of the third embodiment in such a structure, focusing on any difference from the first embodiment.

The picture determination part 32 refers to a marker bit in the RTP header of the video packet i which is currently processed so as to determine whether the packet i configures the same picture as the preceding video packet (i−1). If the marker bit which is of the video packet (i−1), the video packet i is determined as configuring the same picture as the video packet (i−1), otherwise, the video packet i is determined as not configuring the same picture as the video packet (i−1).

By referring to a picture determination signal which is outputted according to the determination result of the picture determination part 32, the timestamp compression scheme determination part 33 compares the delta timestamp $\Delta t(i)$ computed by the timestamp calculation information computing part 11 with the delta timestamp $\Delta TS$ which is kept track by the timestamp calculation information tracking part 14. If both delta timestamps are found as being the same, i.e., $\Delta t(i)=\Delta TS$, the timestamp compression scheme determination part 33 determines that the timestamp should be compressed. Thus, the input switch part 18 is so controlled that the video packet i is forwarded to the timestamp compression part 16. On the other hand, if those delta timestamps are found as being not the same, i.e., $\Delta t(i) \neq \Delta TS$, the timestamp compression scheme determination part 33 refers to the picture determination signal so as to determine whether the video packet i configures the same picture as the video packet (i−1). If yes, the timestamp compression scheme determination part 33 updates the delta timestamp $\Delta TS$ to the delta timestamp $\Delta t(i)$. Also, the timestamp compression scheme determination part 33 controls the input switch part 18 so that the video packet i goes to the timestamp non-compression part 15. On the other hand, if not configuring the same picture, the timestamp compression scheme determination part 33 controls, without updating the delta timestamp $\Delta TS$, the input switch part 18 so that the video packet i goes to the timestamp non-compression part 15.

Lastly, by referring to the flowchart of FIG. 7, described is the procedure of the header compression scheme carried out by the header compression apparatus of the third embodiment.

First, the delta timestamp $\Delta TS$ is registered (updated) (step S71). Its value may be predetermined, or a value obtained by computation between first and second packets may be used. Once an arbitrary packet i has been inputted, the delta timestamp $\Delta t(i)$ will be computed (step S72). Then, the delta timestamp $\Delta t(i)$ and the delta timestamp $\Delta TS$ are compared with each other (step S73). Here, if these delta timestamps are found as being the same, the minimum compression packet header carrying no timestamp is generated (step S74). If not the same, the video packet i is determined whether or not configuring the same picture as the preceding video packet (i−1) (step S75). If yes, the delta timestamp $\Delta TS$ is updated (step S76), and the reference information update packet header carrying a timestamp is generated (step S77). At this time, any field of the extension portion needed to update the delta timestamp is added. If not configuring the same picture, the reference information update packet header is generated without the delta timestamp $\Delta TS$ updated (step S77). At this time, no extension portion is added to update the delta timestamp. Then, if there is any packet left for such a sequence of processes (steps S78, S79), the procedure returns to step S72 and repeats the same sequence.

As described above, according to the header compression scheme and apparatus of the third embodiment, before updating the timestamp calculation information, the current video packet is determined if configuring the same picture as the preceding video packet. If the current video packet is determined as configuring the same picture as the preceding video packet, the timestamp calculation information is updated.

In such a manner, efficiency in header compression, i.e., data transmission, can be enhanced appropriately responding to the transmission data.

Note that, in the above first to third embodiments, the delta timestamps ($\Delta t(i)$, $\Delta TS$), which show any timestamp increase per sequence number, is used as the timestamp calculation information (dt(i), dTS). This is not restrictive, and any information will do as long as the timestamps can be calculated for each packet.

While the invention has been described in detail, the foregoing description is in all aspects illustrative and not restrictive. It is understood that numerous other modifications and variations can be devised without departing from the scope of the invention.

What is claimed is:

1. A header compression method for compressing and transmitting, by using predetermined timestamp calculation information, a packet including transmission data and a header in which a timestamp is included in a system where transmission and reception ends share the same timestamp calculation information for header compression and decompression, the header compression method comprising:

deriving timestamp calculation information dt(i) which is used to calculate a timestamp of a packet i (where i is a positive integer) to be compressed;

storing the timestamp calculation information dt(i) in a history record as timestamp calculation information which has been so far transmitted;

keeping track of tracked timestamp calculation information which is used for header compression;

comparing the tracked timestamp calculation information and the timestamp calculation information dt(i) with each other, and when the tracked timestamp calculation information and the timestamp calculation information dt(i) are the same, compressing the timestamp of the packet i by using the tracked timestamp calculation information, and transmitting a resultant header carrying no timestamp; and determining, when the tracked timestamp calculation information and the timestamp calculation information dt(i) are not the same in said comparing, by referring to the history record, whether or not to update the tracked timestamp calculation information to the timestamp calculation information dt(i) to transmit a resultant header carrying the timestamp, if updated, together with an update signal.

2. The header compression scheme according to claim 1, wherein when, for transmission, the resultant header carrying no timestamp requires an F byte, the resultant header carrying the timestamp requires an N byte, and the update signal requires an M byte, said determining transmits the header carrying the timestamp together with the update signal indicating that the tracked timestamp calculation information is updated to the timestamp calculation information dt(i) if the history record has the same information as the timestamp calculation information dt(i) for $2\times(M+N-F)/(N-F)$ pieces or more consecutively, and if not, transmits the resultant header carrying no timestamp without updating the tracked timestamp calculation information.

3. A header compression apparatus for compressing and transmitting, by using predetermined timestamp calculation information, a packet including transmission data and a header in which a timestamp is included in a system where transmission and reception ends share the same timestamp calculation information for header compression and decompression, the header compression apparatus comprising:

a computing part for deriving timestamp calculation information dt(i) which is used to calculate a timestamp of a packet i (where i is a positive integer) to be compressed;

a history record storage part for storing the timestamp calculation information dt(i) in a history record as timestamp calculation information which has been so far transmitted;

a tracking part for keeping track of tracked timestamp calculation information which is used for header compression;

a first header compression part for compressing the timestamp of the packet i based on the tracked timestamp calculation information, and transmitting a resultant header carrying no timestamp;

a second header compression part for not compressing the timestamp of the packet i, and transmitting a resultant header carrying the timestamp;

a compression scheme determination part for comparing the tracked timestamp calculation information and the timestamp calculation information dt(i) with each other, and if the tracked timestamp calculation information and the timestamp calculation information dt(i) are the same, controlling the packet i to go to said first header compression part, and if the tracked timestamp calculation information and the timestamp calculation information dt(i) are not the same, controlling the packet i to go to said second header compression part and determining whether or not to update the tracked timestamp calculation information kept track of by said tracking part to the timestamp calculation information dt(i) based on the history record; and an update signal control part for controlling, when the tracked timestamp calculation information is updated to the timestamp calculation information dt(i), said second header compression part to transmit an update signal.

4. The header compression apparatus according to claim 3, wherein when, for transmission, the resultant header carrying no timestamp requires an F byte, the resultant header carrying the timestamp requires an N byte, and the update signal requires an M byte, said compression scheme determination part controls said tracking part to update the tracked timestamp calculation information to the timestamp calculation information dt(i) if the history record has the same information as the timestamp calculation information dt(i) for $2\times(M+N-F)/(N-F)$ pieces or more consecutively, and if not, does not control said tracking part to update the tracked timestamp calculation information.

5. A program stored on a computer device readable medium for carrying out, in a computer device, a header compression scheme for compressing, by using predetermined timestamp calculation information, a packet including transmission data and a header in which a timestamp is included, said program comprising:

an operation of deriving timestamp calculation information dt(i) which is used to calculate a timestamp of a packet i (where i is a positive integer) to be compressed;

an operation of storing the timestamp calculation information dt(i) in a history record as timestamp calculation information which has been so far transmitted;

an operation of keeping track of tracked timestamp calculation information which is used for header compression;

an operation of comparing the tracked timestamp calculation information and the timestamp calculation information dt(i) with each other, and when the tracked timestamp calculation information and the timestamp calculation information dt(i) are the same, compressing the timestamp of the packet i by using the tracked timestamp calculation information, and generating a resultant header carrying no timestamp; and an operation of determining, when the tracked timestamp calculation information and the timestamp calculation information dt(i) are not the same in said comparing operation, by referring to the history record, whether or not to update the tracked timestamp calculation information to the timestamp calculation information dt(i) to generate a resultant header carrying the timestamp, if updated, together with an update signal.

6. The program according to claim 5, wherein when, for transmission, the resultant header carrying no timestamp requires an F byte, the resultant header carrying the timestamp requires an N byte, and the update signal requires an M byte, said determining operation generates the header carrying the timestamp together with the update signal indicating that the tracked timestamp calculation information is updated to the timestamp calculation information dt(i) if the history record has the same information as the timestamp calculation information dt(i) for $2\times(M+N-F)/(N-F)$ pieces or more consecutively, and if not, generates the resultant header carrying no timestamp without updating the tracked timestamp calculation information.

* * * * *

UNITED STATES PATENT AND TRADEMARK OFFICE
CERTIFICATE OF CORRECTION

PATENT NO. : 7,024,490 B2
APPLICATION NO. : 09/985421
DATED : April 4, 2006
INVENTOR(S) : Koichi Hata et al.

It is certified that error appears in the above-identified patent and that said Letters Patent is hereby corrected as shown below:

On the Cover Page
In Section (56) References Cited, under the "OTHER PUBLICATIONS" heading, please correct (where underlined) the second and third references to read as follows:

Anton Martensson, Torbjon Einarsson, Lars-Erik Jonsson: "ROCCO Conversational Video Profiles" INTERNET-DRAFT, DRAFT-IETF-ROHC-RIP-ROCCO-VIDEO-00, `Online', 24 May 2000 (2000-05-24), XP002288035.

Akihiro Miyazaki, Hideaki Fukushima, Thomas Wiebke, Rolf Hakenberg, Carsten Burmeister: "Robust Header Compression Using Keyword-Packets", INTERNET DRAFT, DRAFT-MIYAZAKI-ROHC-KWHC-00, `Online' 1 March 2000 (2000-03-01), XP002288036.

Signed and Sealed this

First Day of August, 2006

JON W. DUDAS
*Director of the United States Patent and Trademark Office*